United States Patent
Hata et al.

(10) Patent No.: US 8,883,260 B2
(45) Date of Patent: Nov. 11, 2014

(54) APPARATUS AND METHOD FOR PRODUCING CARBON

(75) Inventors: Kenji Hata, Tsukuba (JP); Satoshi Yasuda, Tsukuba (JP); Don N. Futaba, Tsukuba (JP); Motoo Yumura, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 345 days.

(21) Appl. No.: 13/378,128

(22) PCT Filed: Jun. 17, 2010

(86) PCT No.: PCT/JP2010/060317

§ 371 (c)(1),
(2), (4) Date: May 2, 2012

(87) PCT Pub. No.: WO2010/147191

PCT Pub. Date: Dec. 23, 2010

(65) Prior Publication Data

US 2012/0231163 A1    Sep. 13, 2012

(30) Foreign Application Priority Data

Jun. 17, 2009  (JP) .................... 2009-144722

(51) Int. Cl.
  *C23C 16/00*   (2006.01)
  *C01B 31/02*   (2006.01)
  *B82Y 30/00*   (2011.01)
  *B82Y 40/00*   (2011.01)

(52) U.S. Cl.
  CPC ........... *C01B 31/0226* (2013.01); *B82Y 30/00* (2013.01); *B82Y 40/00* (2013.01)
  USPC .................................... 427/249.1; 427/248.1

(58) Field of Classification Search
  CPC .. C23C 16/26; C23C 16/0281; C23C 16/455; C23C 16/45523; C01B 2202/00; C01B 31/02; C01B 31/00
  USPC ........................................... 427/248.1, 249.1
  See application file for complete search history.

(56) References Cited

U.S. PATENT DOCUMENTS

2010/0062157 A1 *  3/2010  Hata et al. ................. 427/249.1

FOREIGN PATENT DOCUMENTS

| JP | 2008-137831 | 6/2008 |
| JP | 2008137831 A * | 6/2008 |

(Continued)

OTHER PUBLICATIONS

International Search Report issued Sep. 21, 2011 in International (PCT) Application No. PCT/JP2010/060317.

*Primary Examiner* — Kelly M Gambetta
(74) *Attorney, Agent, or Firm* — Wenderoth, Lind & Ponack, L.L.P.

(57) ABSTRACT

A method and an apparatus for efficiently producing a high-purity CNT assembly of a high specific surface area are provided in which a feedstock gas is contacted to a catalyst in an optimum form for CNT growth.

A carbon nanotube producing apparatus of the present invention includes: a synthesis furnace; a gas supply pipe and a gas exhaust pipe in communication with the synthesis furnace; heating means that heats inside of the synthesis furnace to a predetermined temperature; and gas blowing means that blows a feedstock gas into the synthesis furnace after the feedstock gas is supplied through the gas supply pipe. The feedstock gas supplied through the gas supply pipe is supplied into a heating region of the synthesis furnace heated by the heating means, so as to produce a carbon nanotube from a surface of a catalyst layer provided on a base. The feedstock gas is evacuated through the gas exhaust pipe. The carbon nanotube producing apparatus further includes residence time adjusting means that allows the feedstock gas to contact the surface of the catalyst layer on the base in a substantially uniform amount after substantially the same residence time.

2 Claims, 15 Drawing Sheets

(56) References Cited

FOREIGN PATENT DOCUMENTS

JP        2008137831  A1  *   6/2008
WO        2008/096699          8/2008
WO        WO 2008096699  A1  *   8/2008

\* cited by examiner

APPARATUS AND METHOD FOR PRODUCING CARBON

TECHNICAL FIELD

The present invention relates to an apparatus and a method for efficiently producing a high-purity carbon nanotube assembly of a high specific surface area in a catalyst activating substance-containing, high-carbon-concentration environment.

BACKGROUND ART

There are high expectations for the development of carbon nanotubes (hereinafter, also referred to as "CNTs") in functional new materials such as in electronic device materials, optical element materials, conductive materials, and bio-related materials. To this end, carbon nanotubes have been studied from various angles, including use, quality, and mass producibility.

One known CNT producing method is a chemical vapor deposition method (hereinafter, also referred to as "synthesis method"; see Non-Patent Document 1, Patent Documents 1 and 2). The method is characterized by contacting a feedstock gas such as a carbon compound with particles of catalyst in a high temperature atmosphere of about 500° C. to 1,000° C., and enables CNT production under varying conditions, including the type and placement of a catalyst, the type of a feedstock gas, reducing gas, carrier gas, synthesis furnace, and reaction conditions. Because of these characteristics, the method has attracted interest as being suited for CNT mass production.

The synthesis method also has other advantages, including the ability to produce both single-walled carbon nanotubes (SWCNTs) and multi-walled carbon nanotubes (MWCNTs), and the ability to produce large numbers of CNTs vertically aligned on a base surface supporting a catalyst.

The single-walled CNTs, in particular, have attracted interest as material of, for example, electronic devices, capacitor electrodes, MEMS members, and fillers of functional materials for their excellent characteristics, including electrical characteristics (extremely high current density), thermal characteristics (heat conductivity comparable to that of diamond), optical characteristics (emission in optical communication band wavelength ranges), hydrogen storage capacity, and metal catalyst supporting ability, and for their characteristics as both a semiconductor and a metal.

With the conventional chemical vapor deposition method, however, carbon impurities that generate during the synthesis of CNT cover the catalyst particles and easily deactivate the catalyst, preventing efficient CNT growth. The catalytic activity is typically about several percent with a lifetime of about 1 min. It is therefore common practice in a conventional single-walled CNT growth step to perform synthesis in a low carbon concentration atmosphere.

The low carbon concentration atmosphere as used herein means a growth atmosphere in which the proportion of the feedstock gas in a gas containing the feedstock gas and atmosphere gas is about 0.1 to 1%. Increasing the carbon concentration using a conventional synthesis method deactivates the catalyst even more easily, and further lowers the CNT growth efficiency.

Accordingly, because of the small supply of the feedstock gas to the catalyst, the conventional synthesis method involves a low CNT growth rate, and only enables production of a single-walled CNT assembly as high as about several ten micrometers. The method is also problematic in terms of cost, because the proportion actually converted into CNT from the introduced feedstock gas in the growth step is poor, and the most of the feedstock gas is wasted.

As previously reported by the present inventors (Non-Patent Document 1), it was found that a very trace amount of water or other catalyst-activating substances contained in a reaction atmosphere dramatically improved catalyst efficiency, and enabled production of a high-purity, high-specific-surface-area, single-walled CNT assembly with improved efficiency.

In this method, the catalyst-activating substance added to a CNT synthesis atmosphere removes the carbon impurities covering the catalyst particles, and cleans a base surface of a catalyst layer. As a result, the catalytic activity significantly improves, and the lifetime becomes longer. The improved catalytic activity and the longer lifetime attained by the addition of the catalyst-activating substance increased a single-walled CNT growth time to about several ten minutes from about mere 2 minutes in the conventional method, and improved the catalytic activity to 84% from mere several percent in the conventional method.

This made it possible to obtain a single-walled CNT assembly of a height several hundred times higher than a conventional 4 μm (a height of 2.5 mm in Non-Patent Document 1, a 625-fold increase from 4 μm). This is because the catalytic activity greatly increases in the presence of the catalyst-activating substance, and makes it possible to prevent the catalyst from losing activity even under a high-carbon-concentration environment. The CNT is therefore able to grow for extended time periods at a significantly increased growth rate. As used herein, the "high-carbon-concentration environment" means a growth atmosphere in which the proportion of the feedstock gas in a feedstock-containing gas containing the feedstock gas, atmosphere gas, and catalyst-activating substance is about 2% to 20%.

CITATION LIST

Non-Patent Document

Non-Patent Document 1
Kenji Hata et al, Water-Assisted Highly Efficient Synthesis of Impurity-Free Single-Walled Carbon Nanotubes, SCIENCE, 2004 Nov. 19, vol. 306, p. 1362-1364

Patent Document

Patent Document 1 JP-A-2003-171108
Patent Document 2 JP-A-2007-261839
Patent Document 3 Japanese Patent Application No. 2008-051321
Patent Document 4 Japanese Patent Application No. 2006-324416
Patent Document 5 Japanese Patent Application No. 2007-42672

There have also been proposed various feedstock gas supplying means, and producing apparatuses provided with such means, intended to produce CNTs in large quantity. For example, Patent Document 4 discloses an apparatus and a method for producing CNTs whereby a feedstock gas is horizontally blown onto a surface of a catalyst layer on a base through a plurality of feedstock gas discharge openings to contact the feedstock gas to the catalyst layer surface substantially uniformly, enabling carbon nanotubes to be efficiently produced over a large area in a substantially uniform fashion. The CNT producing apparatus described in Patent Document 4 includes, as illustrated in FIG. 15, a U-shape feedstock gas supply pipe 101 surrounding a catalyst layer 2 that represents a catalyst particle-disposed region on a substrate surface, and the feedstock gas is blown onto the catalyst through a plurality of gas discharge openings 102 provided in the feedstock gas supply pipe 101.

Patent Document 4 also discloses a producing apparatus in which a part of the feedstock gas supply pipe disposed in a reaction furnace has a length sufficient to heat the discharged feedstock gas through the feedstock gas discharge openings near a predetermined temperature. However, because the feedstock gas is blown onto the catalyst layer surface through a single-channel gas supply pipe, the feedstock gas contacts the catalyst after different residence times in a heating region. Specifically, the publication lacks a technical idea of providing the same residence time for the feedstock gas that contacts the catalyst.

Patent Document 5 discloses a producing apparatus in which a plurality of hollow members is provided in a first portion inside a feedstock gas-supplied heating region to increase a contact area between the feedstock gas and a heating unit, and to promote decomposition of the feedstock gas, in order to produce CNTs at low temperature. However, the apparatus is simply an addition of a plurality of hollow members in a feedstock gas channel portion used in conventional techniques, and lacks a technical idea of intentionally increasing and adjusting the heat volume to increase and adjust the residence time of the feedstock gas, nor does it have a technical idea of contacting the feedstock gas to the catalyst on a base in a substantially uniform amount after substantially the same residence time.

SUMMARY OF INVENTION

Problems that the Invention is to Solve

The CNT synthesis under a catalyst-activating substance-containing, high-carbon-concentration environment brought a marked improvement in growth efficiency over the conventional technique. However, unlike the conventional synthesis technique, CNT assembly production by the present technique involves technical problems specific to the catalyst activating substance-containing, high-carbon-concentration environment.

Further, the synthesis under a catalyst-activating substance-containing, high-carbon-concentration environment tends to lower purity and specific surface area as a result of the exposure of the produced CNTs to a high-concentration feedstock gas and the adhesion of carbon impurities.

Further, because the growth efficiency, including growth rate and yield, is a major factor for producing CNTs in large quantity at low cost in producing large quantities of CNTs using a continuous synthesis apparatus or the like, it is important to develop a synthesis method that improves growth efficiency under a catalyst-activating substance-containing, high-carbon-concentration environment.

The present invention has been made over the problems of the conventional techniques, and it is a primary object of the invention to provide a method and an apparatus for efficiently producing a high-purity CNT assembly of a high specific surface area, whereby a feedstock gas is contacted to a catalyst in an optimum form for CNT growth by promoting and optimizing the decomposition of the feedstock gas through adjustments of not only a feedstock gas carbon weight flux, but the conventionally neglected residence time of heating the feedstock gas in a synthesis furnace, specifically by increasing the residence time.

Another primary object of the present invention is to provide an apparatus for efficiently producing a high-purity CNT assembly of a high specific surface area in a substantially uniform fashion over a large area by contacting a carbon weight flux- and residence time-adjusted feedstock gas in a substantially uniform supply amount per unit area of a catalyst-disposed region of a base.

Yet another object of the present invention is to provide an apparatus and a method for efficiently producing a high-purity CNT assembly of a high specific surface area in a substantially uniform fashion over a large area by providing the same residence time for the carbon weight flux- and residence time-adjusted feedstock gas that comes into contact with the catalyst on a base.

Specifically, it is an object of the present invention to provide a producing method optimum for synthesizing CNTs with a greatly improved growth rate and with an extended catalyst lifetime in a growth step performed in a catalyst-activating substance-containing, high-carbon-concentration environment, and an apparatus for performing the method.

Note that the "CNT assembly" as used herein refers to an assembly of a plurality of CNTs grown in a certain direction from a growth base, and encompasses objects obtained by collectively detaching the CNT assembly from the base. In this case, the CNT assembly may be in a form of a powder.

Further, the "growth rate" as used herein is defined as the height (μm/min) of the CNT grown in 1 minute from the start of CNT growth. The growth rate may be determined from the height in 1 minute of growth, using the telecentric measurement system described in Patent Document 3. More conveniently, the height of the CNT assembly produced in 1 minute of growth in the growth step may be measured after the production.

Means for Solving the Problems

The present inventors conducted intensive studies on a chemical vapor deposition method in which a feedstock gas is contacted to a base having a metal catalyst on a surface to grow a carbon nanotube in a high-temperature furnace, and contacted the feedstock gas to the catalyst on the base in a substantially uniform amount after substantially the same residence time by optimizing the feedstock gas-heating residence time, and a carbon weight flux, which is a measure of carbon amounts that pass per unit area per unit time. As a result, a method and an apparatus therefor for efficiently producing a high-purity carbon nanotube assembly of a high specific surface area under a catalyst-activating substance-containing, high-carbon-concentration environment were provided.

A carbon nanotube producing apparatus of the present invention includes:

a synthesis furnace;

a gas supply pipe and a gas exhaust pipe in communication with the synthesis furnace;

heating means that heats inside of the synthesis furnace to a predetermined temperature; and gas blowing means that blows a feedstock gas into the synthesis furnace after the feedstock gas is supplied through the gas supply pipe, wherein the feedstock gas supplied through the gas supply pipe is supplied into a heating region of the synthesis furnace heated by the heating means, so as to produce a carbon nanotube from a surface of a catalyst layer provided on a base, and wherein the feedstock gas is evacuated through the gas exhaust pipe, the apparatus characterized by further including residence time adjusting means that allows the feedstock gas to contact the surface of the catalyst layer on the base in a substantially uniform amount after substantially the same residence time.

A carbon nanotube producing apparatus of the present invention includes:

a synthesis furnace;

a gas supply pipe and a gas exhaust pipe in communication with the synthesis furnace;

heating means that heat inside of the synthesis furnace to a predetermined temperature;

gas blowing means that blows a feedstock gas into the synthesis furnace after the feedstock gas is supplied through the gas supply pipe;

gas blowing means arranged in a heating region heated by the heating means;

gas flow forming means that multidirectionally distributes the feedstock gas supplied through the gas supply pipe;

residence time adjusting means that adjusts a residence time of the feedstock gas heated by the heating means; and carbon weight flux adjusting means that adjusts a carbon weight flux of the feedstock gas, wherein the feedstock gas is supplied into the heating region of the synthesis furnace heated by the heating means, so as to produce a carbon nanotube from a catalyst on a base, and wherein the feedstock gas is evacuated through the gas exhaust pipe.

It is preferable in the carbon nanotube producing apparatus that the residence time adjusting means include turbulence suppressing means.

It is preferable in the carbon nanotube producing apparatus that the residence time adjusting means adjust a heat volume of the feedstock gas heated in the heating region.

It is preferable in the carbon nanotube producing apparatus that the heat volume be adjusted to increase.

It is preferable in the carbon nanotube producing apparatus that the gas flow forming means form a feedstock gas flow substantially parallel to a surface of the base.

It is preferable in the carbon nanotube producing apparatus that the gas blowing means form a feedstock gas flow substantially vertical to the surface of the base.

It is preferable in the carbon nanotube producing apparatus that the residence time adjusting means be provided in communication with the gas flow forming means.

It is preferable in the carbon nanotube producing apparatus that the surface of the catalyst layer provided on the base be separated by at least 40 mm from the gas blowing means provided for the gas flow forming means provided opposite the catalyst surface.

It is preferable in the carbon nanotube producing apparatus that the residence time adjusting means be provided in communication with the gas supply pipe.

It is preferable in the carbon nanotube producing apparatus that the residence time adjusting means include a plurality of gas blowing means.

It is preferable in the carbon nanotube producing apparatus that the residence time adjusting means include the gas flow forming means that multidirectionally distributes the feedstock gas supplied through the gas supply pipe.

It is preferable in the carbon nanotube producing apparatus that at least one of the residence time adjusting means, the gas flow forming means, and the turbulence suppressing means be a heat-resistant alloy.

It is preferable in the carbon nanotube producing apparatus that at least one of the residence time adjusting means, the gas flow forming means, and the turbulence suppressing means include a carburization preventing layer.

It is preferable in the carbon nanotube producing apparatus that the heat volume of a feedstock gas channel heated by the heating means, and an evacuation volume of an evacuation channel be specified in the heating region in such a manner that the heat volume exceeds the evacuation volume.

It is preferable in the carbon nanotube producing apparatus that the cross sectional area of the channel of the feedstock gas blown from the plurality of gas blowing means substantially coincide with the area of a surface where the feedstock gas channel and a catalyst-forming surface cross.

A carbon nanotube producing method of the present invention includes:

supplying into a synthesis furnace a feedstock gas and an atmosphere gas after adjusting a carbon weight flux from supply amounts of the feedstock gas and the atmosphere gas; and contacting the feedstock gas to a catalyst layer on a base in substantially a uniform amount after substantially the same residence time to grow a carbon nanotube.

It is preferable in the carbon nanotube producing method that the feedstock gas contact a surface of the catalyst layer on the base substantially vertically with respect to a surface of the base after being flown in multiple directions substantially parallel to the surface of the base.

It is preferable that the carbon nanotube producing method further include the step of forming catalyst particles on a catalyst film by supplying a reducing gas prior to the carbon nanotube growing step.

It is preferable that the carbon nanotube producing method further include the step of installing the base in a heating region after adjusting an evacuation volume to be smaller than a heat volume prior to the carbon nanotube growing step, wherein the evacuation volume is specified by a volume of a channel in the heating region for the feedstock gas contacting the base and discharging through a gas exhaust pipe, and wherein the heat volume is specified by a volume of a channel in the heating region for the feedstock gas supplied through a gas supply pipe and contacting the base.

Advantage of the Invention

The method of the present invention enables production of a high-purity CNT assembly of a high specific surface area at higher yield and higher growth rate than in the conventional technique. This makes it possible to greatly reduce feedstock gas wastes, and to easily produce a high-purity carbon nanotube assembly of a high surface area in a short time period and in large quantity. The method therefore has good potential in industrial applications.

DETAILED DESCRIPTION OF THE INVENTION

The constituting elements of the present invention are specifically described below with reference to the accompanying drawings.

Figure 1:
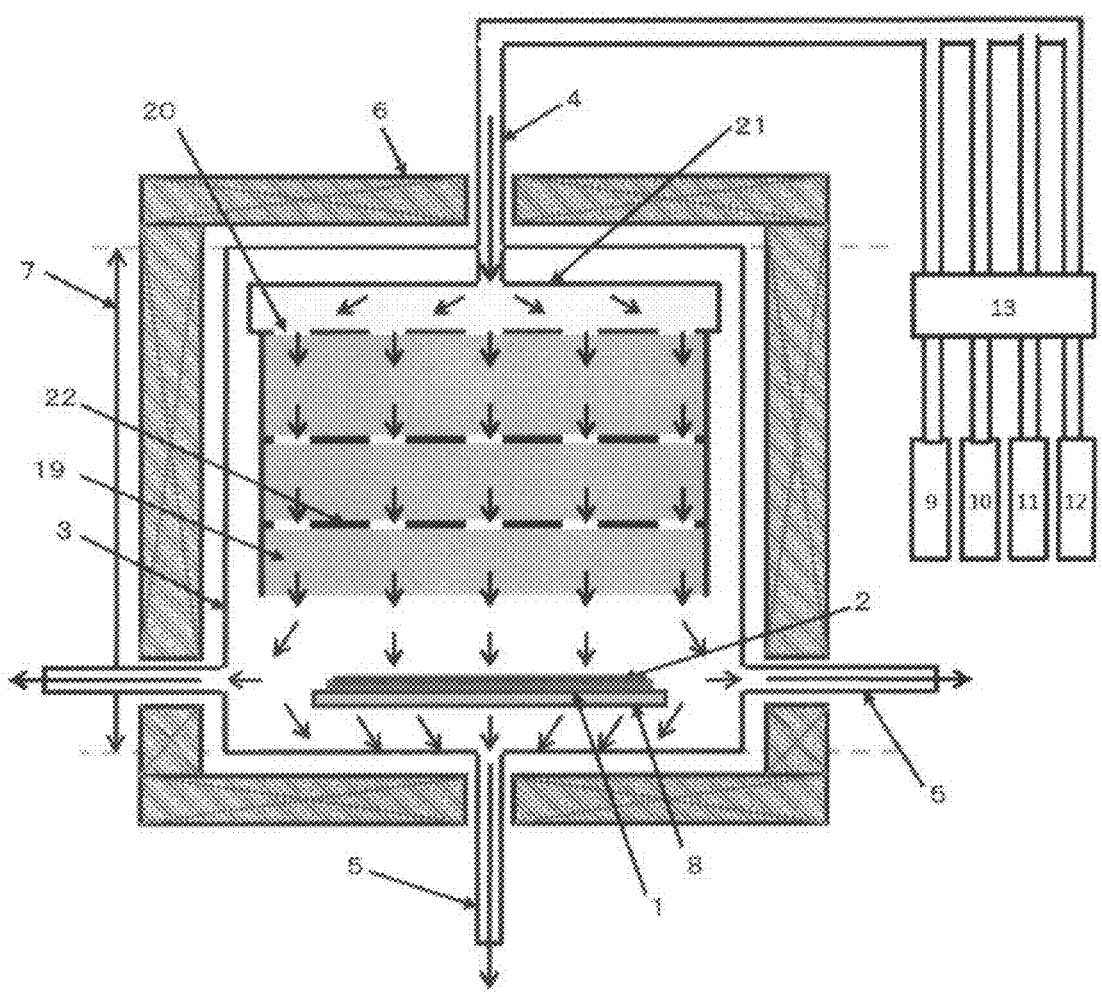
FIG. 1 is a diagram schematically representing a CNT producing apparatus to which the present invention is applicable.
Figure 2:
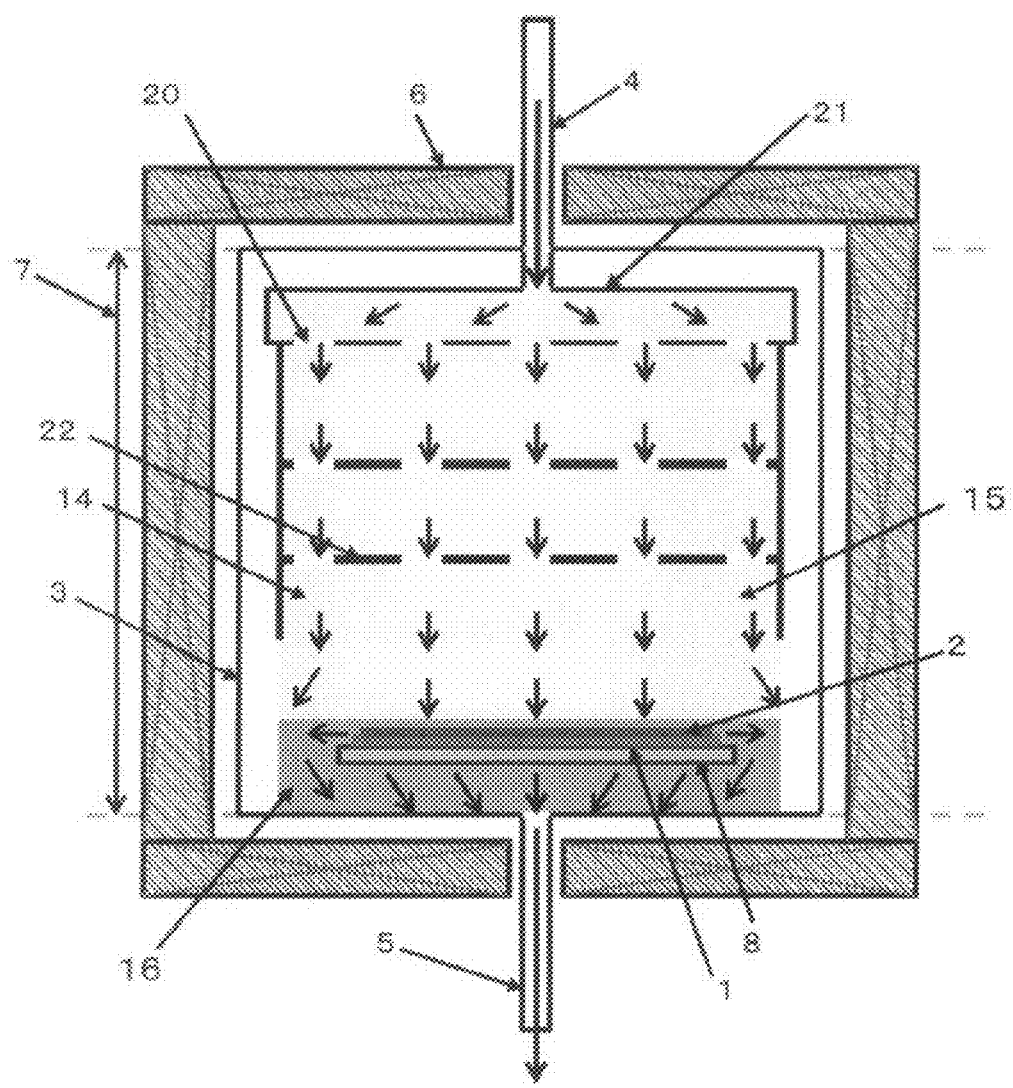
FIG. 2 is a diagram schematically representing a CNT producing apparatus to which the present invention is applicable.

FIGS. 1 and 2 illustrate an example of a synthesis apparatus to which the present invention is applicable. The synthesis apparatus includes: a synthesis furnace 3 made of, for example, fused quartz, housing a base 1 having a catalyst layer 2; a gas supply pipe 4 provided through an upper wall of the synthesis furnace 3 and in communication with the synthesis furnace 3; gas exhaust pipes 5 provided through a downstream bottom wall or side walls and in communication with the synthesis furnace 3; heating means 6 realized by, for example, a resistance heating coil, surrounding the synthesis furnace 3; heat temperature adjusting means that adjusts the temperature inside the furnace to a predetermined temperature; and a heating region 7 as a region inside the synthesis furnace 3 heated to a predetermined temperature by the heating means 6 and the heat temperature adjusting means. A base holder 8 is also provided with which the base 1 having the catalyst layer 2 is held in the heating region 7 inside the synthesis furnace 3 in a manner allowing a heat volume to exceed an evacuation volume.

Inside the heating region 7 above the base holder 8 and/or the catalyst layer 2, gas flow forming means 21 is disposed that distributes and disperses the feedstock gas supplied through the gas supply pipe 4, and thus form multidirectional flows of the feedstock gas. The gas flow forming means 21 forms feedstock gas flows in multiple directions substantially parallel to a surface of the base 1. Further, the gas flow forming means 21 is provided with a plurality of gas blowing means 20 that form flows of the feedstock gas in directions substantially vertical to the surface of the base 1. The gas blowing means 20 is arranged within the same plane substantially parallel to the surface of the base 1.

With the gas flow forming means 21, the feedstock gas supplied through the gas supply pipe 4 can contact the catalyst from directions substantially vertical to the surface of the base 1 after being developed and dispersed over a surface substantially parallel to the surface of the base 1. In this way, the feedstock gas can contact the catalyst in a substantially uniform supply amount per unit area of a catalyst-disposed region on the base 1.

Between the gas blowing means 20 and the catalyst layer 2, there are provided the heat volume intentionally increased and/or adjusted to increase and/or adjust a residence time, and residence time adjusting means 14 connected to and in communication with the gas flow forming means 21, and configured from turbulence suppressing means 22 that includes a plurality of plate-shaped current boards with a plurality of holes. In order to increase the heat volume, the distance between a surface of the catalyst layer 2 on the base 1 and the gas blowing means 20 provided opposite the catalyst surface is set to 40 mm or more (more preferably, 70 mm).

This increases the cross sectional area of the feedstock gas channel in the residence time adjusting means 14, and makes it easier to increase and/or adjust the heat volume and residence time.

Increasing the distance between the gas blowing means 20 and the catalyst layer 2 increases the size of the synthesis furnace 3 and makes the synthesis apparatus complex. Thus, it has been generally considered preferable to reduce the distance to the minimum possible distance (about 10 mm) that allows the feedstock gas to be uniformly supplied to the catalyst layer 2.

In the present invention, the distance is adjusted so as to increase the heat volume of the heated feedstock gas in the heating region 7, and to increase the conventionally neglected residence time. This has made it possible to promote decomposition of the feedstock gas, and to thus enable the feedstock gas to contact the catalyst in a more desirable form for CNT growth. In this way, it became possible to synthesize CNTs more efficiently than in the conventional techniques.

The turbulence suppressing means 22 suppresses a turbulence in the feedstock gas in the residence time adjusting means 14, and provides substantially the same residence time for the feedstock gas that passes the residence time adjusting means 14. This is highly effective at providing substantially the same residence time for the feedstock gas that comes into contact with the catalyst on the base 1. A turbulence easily occurs in the heating region 7 with the intentionally increased heat volume. In the presence of the turbulence, the residence time of the feedstock gas passing the residence time adjusting means 14 can be increased, but the same residence time cannot be provided.

The synthesis apparatus includes a feedstock gas cylinder 9 that stores a carbon compound as a CNT feedstock; a catalyst-activating substance cylinder 10 that stores a catalyst-activating substance; an atmosphere gas cylinder 11 that stores a carrier gas of the feedstock gas and the catalyst-activating substance; and a reducing gas cylinder 12 for reducing the catalyst. A carbon weight flux adjusting means 13 is provided that enables the supply amount of the gas from each cylinder to be controlled with a gas flow unit. The carbon weight flux adjusting means 13 is suited for contacting the feedstock gas to the catalyst in optimum amounts.

A check valve, a flow control valve, and a flow rate sensor are provided at appropriate positions of the gas supply pipe 4, the gas exhaust pipes 5, and each supply unit. The open/close of each flow control valve is appropriately controlled with a control signal from a control unit (not illustrated) so that the feedstock gas, the catalyst-activating substance, the atmosphere gas, and the reducing gas are continuously or intermittently supplied into the synthesis furnace 3 through the gas supply pipe 4 in predetermined flow amounts according to a reaction process.

Carbon Weight Flux

Broadly, carbon weight flux represents the weight of carbon that comes into contact per unit area of the catalyst layer per unit time. The carbon weight flux as a measure of the carbon amount in contact with the catalyst is an important CNT production condition.

Synthesis Furnace

The synthesis furnace 3 is a furnace that houses the catalyst-supporting base 1, and in which CNT synthesis is performed. The synthesis furnace 3 may be made of material that does not inhibit CNT growth, and that can house the catalyst-supporting base 1 at a growth temperature while maintaining uniform heat inside the furnace. For synthesis of large quantities of CNTs, the synthesis furnace 3 may be equipped with a system with which the base 1 can be supplied and taken out multiple times or continuously.

For the present invention to be more effective, it is preferable that the synthesis furnace 3 be vertical, rather than horizontal. The vertical synthesis furnace is one in which the feedstock gas is supplied in a perpendicular (vertical) direction. Supplying the feedstock gas in the perpendicular (vertical) direction is preferable, because it easily allows the feedstock gas to vertically contact the catalyst on the base 1 arranged horizontally.

Gas Supply Pipe

The gas supply pipe 4 is a pipe through which materials such as the feedstock gas, the catalyst-activating substance, the atmosphere gas, and the reducing gas supplied from the carbon weight flux adjusting means 13 are supplied into the synthesis furnace 3, the gas flow forming means 21, and/or the residence time adjusting means 14. Note that, the gas supply pipe 4 can be used to supply not only gas but liquid. Preferably, the gas supply pipe 4 is provided into the synthesis surface 3 through the opening provided through the upper wall and/or side wall of the synthesis furnace 3, in order to supply the feedstock gas in a perpendicular (vertical) direction. The pipe may be partially inserted into the synthesis furnace 3, or an end thereof may reside in the heating region 7. The pipe inserted into the synthesis furnace 3 may be made of material that does not react with the gases, and that maintains its quality and shape even under high heat. Examples include quartz and various metallic materials.

Gas Exhaust Pipe

The gas exhaust pipes 5 is a means, such as a pipe and a duct, through which materials such as the atmosphere gas, the catalyst-activating substance, the reducing gas, and the feedstock gas are evacuated from the synthesis furnace 3. Note that the gas exhaust pipes 5 may evacuate not only gas but liquid. The gas exhaust pipes 5 may be made of material that does not react with the gases, and that maintains its quality and shape. Examples include quartz and various metallic materials. Preferably, the gas exhaust pipes 5 are provided into the synthesis furnace 3 through the openings provided through a bottom wall of the synthesis furnace 3, and/or through the side walls below the gas supply pipe 4. This arrangement of the gas supply pipe 4 and the gas exhaust pipes 5 is preferable, because it allows the feedstock gas to be supplied to the catalyst in a perpendicular (vertical) direction inside the synthesis furnace 3, and, by suppressing a turbulent flow, allows the feedstock gas to contact the surface of the catalyst layer 2 on the base 1 in a substantially uniform amount after substantially the same residence time, as will be described later.

Heating Means and Heating Region

The heating means 6 is a device provided around the synthesis furnace 3 to heat the synthesis furnace 3 and/or the residence time adjusting means 14. The heating means 6 may be selected from the existing heating means, for example, from those using an electrically-heated wire, or those using infrared rays. Note that the heating region 7 as used herein means a space inside the synthesis furnace 3 and/or the residence time adjusting means 14 heated by the heating means 6.

Gas Flow Forming Means

The gas flow forming means 21 is a means by which the feedstock gas supplied from the gas supply pipe 4 is distributed in a plurality of directions. The material, shape, and other attributes of the gas flow forming means 21 are not particularly limited and known means can be appropriately used, as long as the feedstock gas can be distributed and dispersed in the plurality of directions.

Figure 3:
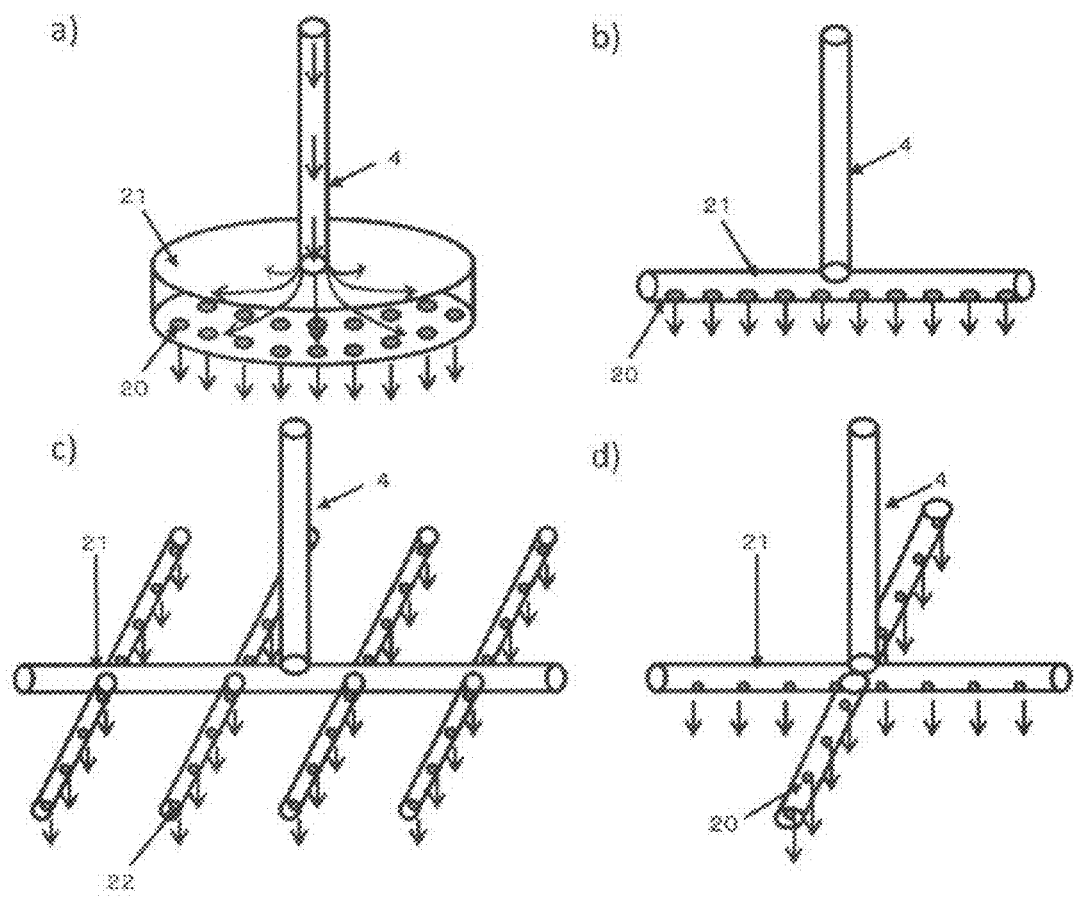
FIG. 3 is a diagram representing the shapes and forms of gas flow forming means.

The gas flow forming means 21 may have the shape or form as illustrated in FIG. 3, including a disc, a cylinder, a hollow structure on a surface, a tubular pipe, a tubular pipe with branches, and combinations of these.

The use of the gas flow forming means 21 is highly effective, because it allows the feedstock gas supplied at one location through the gas supply pipe 4 to be distributed and dispersed over a surface, and enables the feedstock gas to contact in a substantially uniform supply amount per unit area of the catalyst-disposed region on the surface base 1 after substantially the same residence time. The feedstock gas distributed in the plurality of directions by the gas flow forming means 21 forms multidirectional feedstock gas flows. It is preferable that axis lines of the multidirectional flows of the feedstock gas create a maximum angle of 90 degrees or more (more preferably, 180 degrees or more), in order that the feedstock gas supplied at one location through the gas supply pipe 4 is distributed and dispersed over the surface.

Further, it is preferable that the gas flow forming means 21 has a symmetrical axis and be in communication with the gas supply pipe 4 on the symmetrical axis, in order that the feedstock gas supplied at one location through the gas supply pipe 4 is distributed and dispersed over the surface. Further, in order to obtain the foregoing effects, it is preferable that the gas flow forming means 21 form multidirectional flows of feedstock gas substantially parallel to the surface of the base 1. The substantially parallel direction is the direction that makes an angle of at least 45° and less than 135° between a normal line of the base 1 and the axis lines of the flows of the feedstock gas distributed and dispersed in multiple directions by the gas flow forming means 21.

As used herein, the "substantially uniform supply amount" means that the supply of the feedstock gas is uniform to such an extent that the effects of the present invention are obtained, specifically an amount that enables CNT synthesis from substantially the whole surface of the catalyst-disposed region on the base 1.

Gas Blowing Means

The gas blowing means 20 is a means by which materials such as the feedstock gas, the catalyst-activating substance, the atmosphere gas, and the reducing gas supplied into the synthesis furnace 3 through the gas supply pipe 4 are blown inside the synthesis furnace 3. By appropriately dispersing and arranging a plurality of gas blowing means 20 in the gas flow forming means 21 and/or the residence time adjusting means 14, the feedstock gas can effectively contact the catalyst on the base 1 in a uniform amount, and/or the same residence time can be provided for the feedstock gas that comes into contact with the catalyst. Examples of the gas blowing means 20 include blow holes and nozzles arranged on the gas flow forming means 21 configured from, for example, a pipe or a hollow member, and porous materials that have substantially infinite numbers of blow holes. However, any form may be appropriately selected, as long as the foregoing effects can be obtained.

In order to obtain the foregoing effects, it is preferable that the plurality of gas blowing means 20 be provided for the gas flow forming means 21. Preferably, the gas blowing means 20 is provided at such intervals that the blown gas from the plurality of gas blowing means 20 form substantially uniform flows of the feedstock gas. As used herein, "substantially uniform" means that the feedstock gas flows in substantially uniform amounts across the flat cross sectional surface of the feedstock gas flows. In order to obtain the foregoing effects, it is preferable that the plurality of gas blowing means 20 be arranged to form substantially vertical flows of feedstock gas with respect to the surface of the base 1. Further, in order to obtain the foregoing effects, it is preferable that the plurality of gas blowing means 20 be arranged within the same plane substantially parallel to the surface of the base 1.

As used herein, the "substantially vertical direction" means a direction that makes an angle of 0° or more and less than 45° between the normal line of the base 1 and an ejection axis line of the gas blowing means 20. Specifically, the gas flows blown out of the gas blowing means 20 provided on the gas pipe vertically contact the catalyst layer 2 of the base 1.

It is preferable that an angle between the gas blowing means 20 and the gas supply pipe 4 has a maximum value of 90 degrees or more (more preferably, 180 degrees or more), in order that the feedstock gas supplied at one location through the gas supply pipe 4 is distributed and dispersed over the surface.

Residence Time Adjusting Means

The residence time adjusting means 14 is a means by which the residence time is intentionally increased and/or adjusted to increase and/or adjust and to thereby optimize the residence time of the feedstock gas. The shape and form of the residence time adjusting means 14 are not limited, and any known mean may be appropriately used, as long as the residence time of the feedstock gas can be adjusted and optimized. With the use of the residence time adjusting means 14, the conventionally neglected residence time can be adjusted to increase and optimized. The residence time adjusting means 14 is therefore very effective for efficiently producing a CNT assembly at high yield and at high growth rate under a catalyst-activating substance-containing, high-carbon-concentration environment.

In order to obtain the foregoing effects, it is preferable that the residence time adjusting means 14 have a means to intentionally increase and/or adjust the heat volume of the feedstock gas heated in the heating region 7. Such means for increasing the heat volume may be realized by, for example, (i) installing the catalyst layer 2 and the gas blowing means 20 in the heating region 7 in such a manner that the distance between the surface of the catalyst layer 2 on the base 1 and the gas blowing means 20 provided opposite the catalyst surface is 40 mm or more, (ii) providing a hollow structure with a large heat volume 15 for the feedstock gas channel, or (iii) providing in the heating region 7 a long meandering tubular gas pipe having a cross sectional area that does not cause turbulence. The residence time can be adjusted with the residence time adjusting means 14 by (i) adjusting the distance between the surface of the catalyst layer 2 on the base 1 and the gas blowing means 20 provided opposite the catalyst surface, (ii) installing a heat volume-reducing member such as a block in the hollow structure having the large heat volume, or (iii) adjusting the length of the gas pipe in the heating region 7. Finer adjustments of the residence time are possible by increasing and decreasing a flow rate of the atmosphere gas. In a preferred form of the residence time adjusting means 14, the feedstock gas channel has a large cross sectional area. It is therefore preferable that the residence time adjusting means 14 be provided on the following stage of the gas flow forming means 21 in communication therewith, and that the feedstock gas be flown into the residence time adjusting means 14 after being distributed and dispersed in the plurality of directions by the gas flow forming means 21 and flown in a channel of the large cross sectional area.

Preferably, the distance between the surface of the catalyst layer 2 on the base 1 and the gas blowing means 20 provided opposite the catalyst surface is 40 mm or more, because it makes it easier to adjust the residence time between 4 sec to 30 sec. Conversely, it becomes difficult to increase and adjust the residence time to an optimum value, when the distance between the surface of the catalyst layer 2 on the base 1 and the gas blowing means 20 provided opposite the catalyst surface is less than 40 mm.

There is no specific upper limit for the distance between the surface of the catalyst layer 2 on the base 1 and the gas blowing means 20 provided opposite the catalyst surface. However, the distance is preferably 100 cm or less, because the excessively long distance increases the apparatus size.

Even more preferably, a boundary should be such that the distance between the surface of the catalyst layer 2 on the base 1 and the gas blowing means 20 provided opposite the catalyst surface is 70 mm or more at all points on the catalyst layer 2, because it makes it easier to adjust the residence time between 6 sec and 30 sec.

Turbulence Suppressing Means

The shape and other attributes of the turbulence suppressing means 22 are not particularly limited, and the turbulence suppressing means 22 may be formed into any shape with any material, including a current board and a honeycomb, by appropriately using known methods, as long as the feedstock gas is suppressed from forming a turbulent flow before contacting the catalyst after being supplied into the heating region 7 in the synthesis furnace 3 through the gas supply pipe 4.

Further, a gas pipe that does not easily cause turbulence may be used. Such turbulence suppressing means 22 is highly effective at providing substantially the same residence time for the feedstock gas contacting the catalyst on the base 1.

Particularly, the residence time adjusting means 14 generally has the large heat volume and tends to cause turbulence, and should thus be provided with the turbulence suppressing means 22. When turbulence occurs, the same residence time cannot be provided for the feedstock gas, and it becomes difficult to contact the feedstock gas to the surface of the catalyst layer 2 on the base 1 after substantially the same residence time. As used herein, the "substantially the same residence time" means that the residence time is the same to such an extent that the effects of the present invention can be obtained. In the embodiment of the present invention, in order to obtain the effects of the present invention, it is preferable that the residence time fall in a range of from 4 sec to 30 sec, more preferably from 7 sec to 15 sec. Specifically, the residence time of the feedstock gas may have some variation as may be caused by a slight turbulence, as long as the effects of the present invention are obtained.

Material of Producing Apparatus

The material used in part of the producing apparatus, particularly the residence time adjusting means 14, the gas flow forming means 21, the gas blowing means 20, and the turbulence suppressing means 22 may be appropriately selected from known materials, as long as it allows these components to be functional. A heat-resistant alloy may be used as the material for part of the producing apparatus, particularly the residence time adjusting means 14, the gas flow forming means 21, the gas blowing means 20, and the turbulence suppressing means 22. The heat-resistant alloy, with its excellent processibility and mechanical strength, is preferably used for a part of the producing apparatus having a complicated structure.

Examples of the heat-resistant alloy include heat-resistant steel, stainless steel, and nickel-based alloy.

The term "heat-resistant steel" is commonly used for materials that contain Fe as a main component and in which the other alloy concentration is 50% or less. Steels containing Fe as the main component and in which the other alloy concentration is 50% or less and a Cr content is about 12% or more are generally called stainless steel. Examples of the nickel-based alloy include alloys that contain Mo, Cr, Fe, or other elements added to Ni.

Specifically, SUS310, Inconel 600, Inconel 601, Inconel 625, Incoloy 800, MC alloy, Haynes 230 alloy, and the like are preferred in terms of heat resistance, mechanical strength, chemical stability, cost, and the like.

Carburization Preventing Layer

A carburization preventing layer may be formed in part of the producing apparatus, particularly on at least one of front and back surfaces of the residence time adjusting means 14, the gas flow forming means 21, the gas blowing means 20, and the turbulence suppressing means 22. Preferably, the carburization preventing layer is formed on both the front and back surfaces. The carburization preventing layer is preferred for suppressing a chemical reaction between a part of the producing apparatus and the feedstock gas. The carburization preventing layer is also preferred for preventing a part of the producing apparatus from being carburized and deformed by decomposition of the feedstock gas.

Desirably, the carburization preventing layer is configured from a metallic element or a compound thereof that does not exhibit catalytic activity by itself. For example, metal oxides such as alumina ($Al_2O_3$), silicon oxide ($SiO_2$), zirconia ($ZrO_2$), and magnesium oxide (MgO), and metals such as copper and aluminum may be used as such materials.

Residence Time

The residence time refers to the time from the supply of the gas into the heating region 7 inside the synthesis furnace 3 through the gas supply pipe 4 to the contact to the catalyst on the base 1 in the heating region 7 inside the synthesis furnace 3 heated by the heating means 6, specifically the time for the gas to pass the heat volume 15.

Generally, increasing the residence time exposes the feedstock gas to high temperature for longer time periods, and promotes the decomposition reaction of the feedstock gas, with the result that the feedstock gas easily undergoes reaction upon contacting the catalyst, and the CNT production accelerates. However, the excessively long residence time overly promotes the decomposition reaction of the feedstock gas, and causes carbon impurities to generate in large quantity and adhere to the synthesis furnace and to the CNTs produced.

In order to efficiently produce CNTs at high speed and at high yield under a catalyst-activating substance-containing, high-carbon-concentration environment, it is desirable to increase the residence time from the typical 1 to 2 seconds adopted for a furnace in a common synthesis environment.

To this end, it is preferable that the residence time be increased from the typical value using the residence time adjusting means 14. It is particularly preferable that the residence time be increased by increasing the heat volume from the typical volume using the residence time adjusting means 14 that adjusts the heat volume of the feedstock gas.

There is no upper limit for a preferred range of residence time. However, when the heat temperature in the growth step ranges from 600° C. to 1,000° C., the residence time preferably ranges from 4 sec to 30 sec. When the residence time is less than 1 sec, the feedstock gas does not decompose sufficiently, and it becomes difficult to efficiently produce CNTs at high speed and at high yield. When the residence time is longer than 30 sec, the feedstock gas overly decomposes, with the result that carbon impurities generate in large quantity, and adhere to the synthesis furnace 3 and to the CNTs produced.

Heat Volume

The heat volume 15 is defined as the volume of the channel for the feedstock gas supplied into the heating region 7 inside synthesis furnace 3 through the gas supply pipe 4 and came into contact with the catalyst on the base 1 in the heating region 7 of the synthesis furnace 3 heated by the heating means 6, as illustrated in FIG. 2.

It is preferable that the channel in the heating region 7 flowing the feedstock gas be heated to a temperature of at least 400° C., in order to sufficiently heat the feedstock gas and efficiently synthesize CNTs on the catalyst. Less than 400° C., the decomposition of the feedstock gas will not be promoted, and it becomes difficult to obtain the effects of the present invention.

When the base 1 is configured from an assembly of a powdery or bead structure and the feedstock gas contacts the catalyst multiple times, the heat volume 15 is defined as the volume of the channel from the last contact point of the feedstock gas with the catalyst.

When the feedstock gas contacts the catalyst layer 2 in the heating region 7 after flowing through the gas supply pipe 4, the gas flow forming means 21, and the residence time adjusting means 14, the heat volume 15 is defined as the total volume inside the heating region 7, i.e., the volume of the gas supply pipe 4, the volume of the gas flow forming means 21, the volume of the residence time adjusting means 14, and the volume of the channel for the feedstock gas blown through these members and contacted the catalyst.

Evacuation Volume

An evacuation volume 16 is defined as the volume (dark grey area in FIG. 2) of the feedstock gas heated in the heating region 7 heated by the heating means 6 in the channel for the feedstock gas contacting the base 1 and discharging through the gas exhaust pipes 5.

When the base 1 is configured from an assembly of a powdery or bead structure and the feedstock gas contacts the catalyst multiple times, the evacuation volume 16 is defined as the volume of the channel from the last contact point of the feedstock gas with the catalyst.

Carbon Weight Flux Adjusting Means

The carbon weight flux adjusting means 13 is a means by which the supply amount of the feedstock gas providing the feedstock carbon compound for CNTs, and the supply amount of the atmosphere gas as the carrier gas of the feedstock gas and catalyst-activating substance are adjusted with other members such as the gas flow unit, so as to supply any carbon weight flux into the furnace. With the use of this means, the carbon weight flux can be adjusted, and an optimum amount of carbon can be supplied to the catalyst, making it possible to obtain the effects of the present invention.

CNTs can be efficiently produced at high speed with high yield under a catalyst activating substance-containing, high-carbon-concentration environment when the carbon weight flux is adjusted to 40 g/cm²/min to 4,300 g/cm²/min with the carbon weight flux adjusting means 13. The objects of the present invention can thus be achieved in this way. With a carbon weight flux less than 40 g/cm²/min, the feedstock gas cannot be sufficiently supplied to the catalyst, and CNTs cannot be produced at high speed. On the other hand, a carbon weight flux in excess of 4,300 g/cm²/min generates large quantities of carbon impurities, and these carbon impurities adhere to the synthesis furnace 3 and to the CNTs produced.

Carbon Impurity Suppressing Means

Carbon impurity suppressing means is a means that suppresses carbon impurities from generating in the heating region 7 of the synthesis furnace 3, particularly in the vicinity of the base 1. Because the feedstock gas decomposes further in the CNT growth step performed under a catalyst-activating substance-containing, high-carbon environment with the residence time increased and optimally adjusted by increasing the heat volume 15, the amount of carbon impurities generated in the synthesis furnace 3 can be reduced by quickly evacuating the decomposed feedstock gas after the feedstock gas has contacted the catalyst. To this end, it is preferable to increase the cross sectional area of the gas exhaust pipe 5 more than the cross sectional area of the gas supply pipe 4. Further, more than one carbon impurity suppressing means may be provided on side walls of the gas exhaust pipe 5, and/or on the bottom wall of the synthesis furnace 3.

Thus, by installing the base 1 in the heating region 7 in such a manner that the evacuation volume 16 exceeds the heat volume 15, the feedstock gas can be quickly evacuated out of the heating region 7 after the feedstock gas has contacted the catalyst, and carbon impurity production can be suppressed. In this way, a CNT assembly of a high specific surface area can be preferably produced while efficiently producing the CNTs at high yield and reducing the carbon impurity amounts.

Mechanism of the Present Invention

The following considers the mechanism of the present invention that enables high-purity CNTs of a high specific surface area to be produced with improved efficiency at high yield under a catalyst-activating substance-containing, high-carbon-concentration environment by adjusting the feedstock gas residence time and carbon weight flux to contact the feedstock gas to the catalyst in a substantially uniform amount within substantially the same, optimized residence time with the use of the gas flow forming means 21, the plurality of gas blowing means 20, and the residence time adjusting means 14.

When the residence time of the feedstock gas is too short or the amount of feedstock gas per time/unit area is small, the decomposition and reaction efficiency of the carbon compound at the catalyst lowers, and the CNTs cannot be efficiently synthesized. On the other hand, when these are too long or too high, the excess amount will be decomposed at the catalyst. This is not desirable as it considerably shortens the catalyst lifetime, lowers purity because of the adhesion of the decomposed carbon compound to the grown CNTs, or causes carbon impurities such as tar to adhere in large quantity on the downstream side of the synthesis furnace 3.

Further, considering that the introduction of the catalyst-activating substance increased the catalyst lifetime and greatly improved the CNT synthesis efficiency, it can be said that the synthesis efficiency can be optimized with the residence time and carbon weight flux different from those used conventionally.

After repeated multiple experiments, the present inventors were able to minimize the amount of generated impurities while obtaining CNTs efficiently synthesized at high growth rate and at high yield. This was realized by contacting the feedstock gas to the catalyst in an optimum form for CNT growth, by adjusting and increasing the conventionally neglected residence time of the feedstock gas with the use of the residence time adjusting means 14, and, as required, with the turbulence suppressing means 22, and by intentionally confining the carbon weight flux in the foregoing range.

Further, the feedstock gas can contact the surface of the catalyst layer 2 on the surface of the base 1 in a uniform amount after substantially the same residence time, and a uniform CNT assembly can be produced on the base 1 of a large area by multidirectionally diffusing and distributing the feedstock gas supplied to the synthesis furnace 3 at one location through the gas supply pipe 4, using the gas flow forming means 21 and the gas blowing means 20.

The feedstock gas passes the adjusted heat volume 15, and, after the optimized residence time, contacts the catalyst layer 2 in an amount optimized by the carbon weight flux adjusting means 13, and CNTs efficiently grow at high speed and at high yield from the catalyst particles adhered to the base 1 (growth step). After contacting the catalyst layer 2, the gases quickly evacuate through the gas exhaust pipes 5, and carbon impurity production is minimized.

Specifically, by optimizing the decomposition efficiency of the carbon compounds in the feedstock gas, or by optimizing the amount of feedstock gas per time/unit area, the feedstock gas efficiently reacts with the catalyst and converts into CNTs, realizing high-speed CNT growth. Further, because the amounts of the carbon compound in contact with the CNTs are reduced while at the same time greatly improving the yield, high-purity CNTs of a high specific surface area can be synthesized.

Residence Time Specification

Residence time is defined as the passage time of the gas through the heat volume 15. When the flow rate set by the carbon weight flux adjusting means 13 controlling the gas supply amount is calculated at room temperature, the flow amount of the feedstock gas in the heated furnace is given as (flow amount of the feedstock gas in the heated furnace)= (flow amount supplied at room temperature (25° C.))×$\{(293+T)/298\}^{1/2}$.

Accordingly, residence time t is specified as follows.

Residence time $t$=(heat volume)/(flow amount of feedstock gas×$\{(293+T)/298\}^{1/2}$)

Carbon Weight Flux Specification

Figure 4:
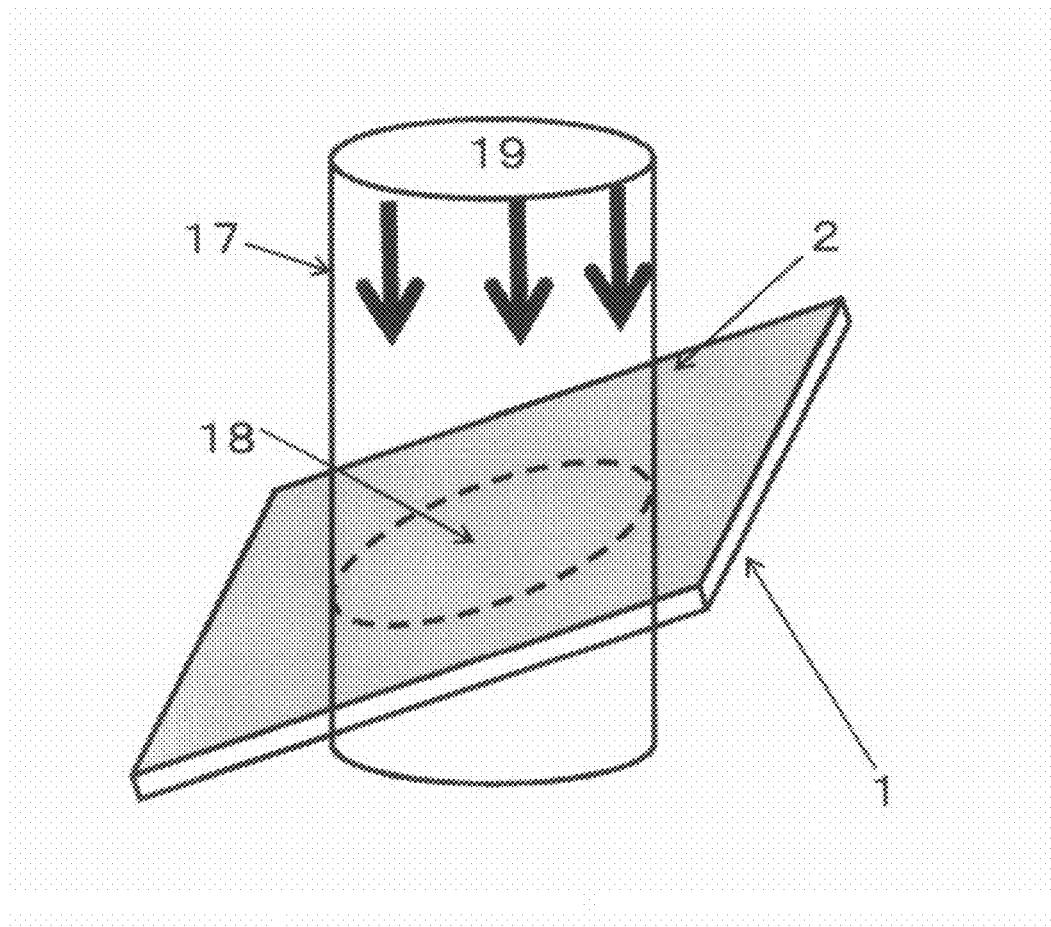
FIG. 4 is a diagram defining a carbon weight flux, as an example.

Broadly, the carbon weight flux represents the weight of the carbon that comes into contact per unit area of the catalyst layer 2 per unit time. As shown in FIG. 4, a carbon weight flux 19 represents the weight of the carbon that comes into contact with a unit cross sectional area of the catalyst layer 2 per unit time, and is calculated by dividing the weight of carbon atoms contained in the feedstock gas that passes through a feedstock gas channel 17 per unit time by an area 18 of a surface where the catalyst layer 2 (a surface or space containing the catalyst on the base 1) and the feedstock gas channel 17 cross. The carbon weight flux can be set by adjustments made by the carbon weight flux adjusting means 13 configured from a mass flow meter, or the like.

Carbon weight flux(g/cm²/min)=12×the number of carbons contained per molecule of the feedstock gas×flow amount of the feedstock gas×furnace pressure/(gas constant×absolute temperature inside the heated furnace)/area of the intersecting surface The area of the surface intersecting with the channel is calculated as substantially zero if a flat substrate as the base 1 is disposed parallel to the channel. This indicates that most of the carbon supplied by the feedstock gas does not contact the catalyst layer 2. Accordingly, if CNTs were produced in this layout, most of the feedstock gas supplied into the synthesis furnace 3 does not contact the catalyst.

Thus, for efficient and high-yield CNT production, it is preferable that the catalyst layer 2 (the surface or space containing the catalyst on the base 1) and the feedstock gas channel 17 generally cross vertically, so that CNTs can be efficiently produced with high yield.

Desirably, the cross sectional area of the feedstock gas channel 17 generally coincides with the area 18 where the feedstock gas channel 17 crosses the catalyst layer 2. With the feedstock gas channel 17, the base 1, and the catalyst layer 2 disposed in this fashion, most of the carbon contained in the feedstock gas can contact the catalyst layer 2, and CNTs can be efficiency produced at high speed.

Figure 5:
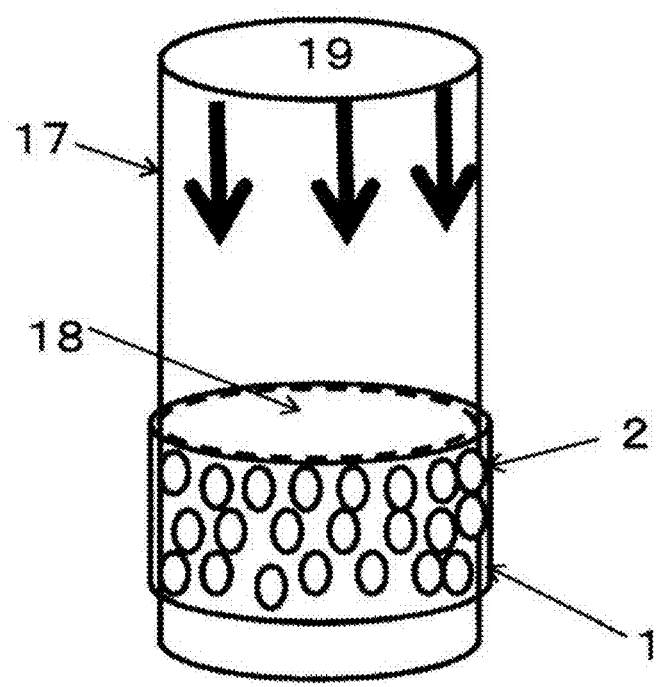
FIG. 5 is a diagram defining a carbon weight flux, as an example.

FIG. 5 represents an example in which granular material is used as the base 1, and the plurality of granules are disposed in a cylinder. The feedstock gas channel 17 substantially vertically crosses a columnar catalyst layer 2 containing the cylinder, and the cross sectional area of the feedstock gas channel 17 generally coincides with the area 18 where the feedstock gas channel 17 and the catalyst layer 2 cross.

When the catalyst layer 2 represents a space, the surface of the catalyst layer 2 is defined as a contact surface between the feedstock gas channel 17 and the catalyst layer 2, and the area of this surface is defined as the area of the catalyst layer 2.

With the feedstock gas channel 17, the base 1, and the catalyst layer 2 disposed in this fashion, most of the carbon contained in the feedstock gas can contact the catalyst layer 2, and CNTs can be efficiency produced at high speed.

When there is a 20% difference between the area 18 where the catalyst layer 2 and the feedstock gas channel 17 cross, the cross sectional area of the feedstock gas channel 17, and the area of the catalyst layer 2, 20% or greater of the feedstock gas or the catalyst is wasted, and efficient CNT production becomes difficult.

Known synthesis techniques can be used for the production of the single-walled CNT assembly according to the present invention. Specifically, the catalyst layer is produced on the base 1, and a plurality of CNTs formed (synthesized) from the catalyst by chemical vapor deposition (CVD).

Referring to FIGS. 1 and 2, the base 1 (for example, silicon wafer) provided beforehand with the catalyst layer 2 (for example, an alumina-iron thin film) in a separate step is installed and placed on the base holder 8 inside the synthesis furnace 3 charged with the atmosphere gas (for example, helium) supplied through the gas supply pipe 4.

Here, the base 1 is arranged in such a manner that the surface of the catalyst layer 2 and the feedstock gas channel generally cross vertically, in order that the feedstock gas is efficiently supplied to the catalyst.

Further, the base 1 is disposed in the heating region 7 to make the evacuation volume 16 smaller than the heat volume 15, in order that the feedstock gas that contacted the catalyst layer 2 can quickly evacuate.

Further, the residence time of the feedstock gas in the synthesis furnace 3 is adjusted and optimized for CNT growth beforehand by the residence time adjusting means 14.

Then, a formation step is performed in which inside the synthesis furnace 3 is heated to a predetermined temperature (for example, 750° C.) while supplying the reducing gas (for example, hydrogen) into the synthesis furnace 3 through the gas supply pipe 4, and in which the heated state is maintained for a desired time period.

The reducing gas particulates the catalyst layer 2, adjusting the catalyst layer 2 to a preferred state as a CNT catalyst. In the formation step, the catalyst-activating substance may be added, as required.

Thereafter, the carbon weight flux adjusting means 13 is used to stop or reduce the supply of the reducing gas and the atmosphere gas through the gas supply pipe 4 as needed (according to reaction conditions), while supplying the feedstock gas (for example, ethylene), the atmosphere gas, and the catalyst-activating substance (for example, water) through the gas supply pipe 4. These gases supplied through the gas supply pipe 4 form gas flows of multiple directions substantially parallel to the surface of the base 1, and are blown onto the surface of the catalyst layer 2 on the base 1 through the blow holes in substantially uniform amounts from substantially vertical directions to the surface of the base 1.

Further, the gases pass the heat volume 15 increased and adjusted by the residence time adjusting means 14, and, after the optimized residence time, contact the surface of the catalyst layer 2 in amounts optimized by the carbon weight flux adjusting means 13, with the result that CNTs efficiently grow at high speed and at high yield from the catalyst particles adhered to the base 1 (growth step). Further, by using the turbulence suppressing means 22 as needed, the gases contact the catalyst particles on the base 1 after substantially the same residence time. Further, after having contacted the catalyst layer 2, the gases quickly evacuate through the gas exhaust pipes 5, and the generation of carbon impurities is kept at minimum.

In order to suppress remaining materials such as the feedstock gas, the catalyst-activating substance, and the decomposed products thereof inside the synthesis furnace 3, and the carbon impurities present inside the synthesis furnace 3 from adhering to the CNT assembly, only the atmosphere gas is flown after the CNT production to suppress the impurities from contacting the CNT assembly (carbon impurity adhesion suppressing step).

The plurality of CNTs simultaneously grown from the catalyst layer 2 on the base 1 grow orthogonally from the catalyst layer 2, and align themselves to form a high-purity CNT assembly of a substantially uniform height having a high specific surface area.

The following describes each condition.

Formation Step

The formation step is the step of creating a reducing gas environment around the catalyst supported on the base 1, and heating at least one of the catalyst and the reducing gas. After this step, the catalyst is reduced, formation of catalyst particles suited for CNT growth is promoted, and/or catalyst activity is improved. For example, when the catalyst is an alumina-iron thin film, an iron catalyst layer is reduced and particulated, and large numbers of nanosized catalyst particles are formed on an alumina layer.

Growth Step

The growth step is the step of creating a feedstock gas environment suited for CNT production around the catalyst, and heating at least one of the catalyst and the feedstock gas to grow a CNT assembly. For CNT assembly production, the growth step is preferably performed after the formation step.

Carbon Impurity Adhesion Suppressing Step

The carbon impurity adhesion suppressing step is the step of suppressing remaining materials such as the feedstock gas, the catalyst-activating substance, and the decomposed products thereof inside the synthesis furnace 3, and the carbon impurities present inside the synthesis furnace 3 from adhering to the CNT assembly after the CNT production. The step may be performed in any manner, as long as it provides the intended effect. As an example of the carbon impurity adhesion suppressing step, the atmosphere gas may be flown for a certain time period (flushing step), or the base 1 may be transferred to a region free of remaining materials such as the feedstock gas, the catalyst-activating substance, and the decomposed products thereof, or the carbon impurities inside the synthesis furnace 3 after the CNT production. Preferably, the base 1 is transferred towards the upstream of the synthesis furnace 3, instead of the downstream where there are large amounts of carbon impurities.

CNT production under high carbon environment generates the feedstock gas and carbon impurities in larger amounts than in the conventional technique inside the synthesis furnace 3, particularly around the base 1 and downstream of the synthesis furnace 3. Because the CNT assembly has an extremely large specific surface area, the presence of the feedstock gas, the carbon impurities, and other such materials around the base 1 after the CNT production causes these materials to adhere to the CNT assembly in the form of carbon impurities, and greatly lowers the specific surface area. Thus, suppressing the impurities from contacting the CNT assembly in the carbon impurity adhesion suppressing step after the CNT production is highly effective in obtaining a CNT assembly of a high specific surface area.

Cooling Step

The cooling step is the step of cooling the CNT assembly, the catalyst, and the base 1 after the growth step. Because the CNT assembly, the catalyst, and the base 1 are in a high-temperature state after the growth step, these materials may be oxidized when placed in an oxygen-containing environment. In order to prevent this, the CNT assembly, the catalyst, and the base 1 are cooled to preferably 400° C. or less, more preferably 200° C. or less in a cooling gas environment. A cooling gas is preferably an inert gas, particularly nitrogen in terms of safety, economy, and purging.

Base (Substrate)

The base 1 (substrate) is a member capable of supporting the catalyst on which the CNTs are grown. Any member may be appropriately used, as long as it can maintain its shape even under high temperatures of 400° C. and higher.

For producing large quantities of CNTs using the effects of the present invention, the base 1 preferably has a flat form such as a form of a flat plate. However, the base 1 may be a flat assembly of powdery or linear material.

Examples of the materials that have been actually used for CNT production include: metals such as iron, nickel, chromium, molybdenum, tungsten, titanium, aluminum, manganese, cobalt, copper, silver, gold, platinum, niobium, tantalum, lead, zinc, gallium, indium, germanium, arsenic, phosphorus, and antimony, and alloys and oxides containing these metals; nonmetals such as silicon, quartz, magnesia, spinel, calcia, dolomite, chromia, zirconia, titania, mullite, glass, mica, graphite, alumina, magnesium oxide, potassium titanate, zirconium oxide, zeolite, silica, titanium oxide, and diamond; ceramics; and mixtures of these.

The metals are less expensive, and are therefore more preferred over silicon and ceramics. Particularly preferred examples for the present invention include iron-chromium (Fe—Cr) alloy, iron-nickel (Fe—Ni) alloy, and iron-chromium-nickel (Fe—Cr—Ni) alloy.

Specific examples of the powdery or linear material include plate-like alumina, a quartz flake, a quartz fiber, a ceramic fiber, and fibrous titanium oxide.

Catalyst

In the present invention, any catalyst that has actually been used for CNT production may be appropriately used as the catalyst supported on the base 1 and forming the catalyst layer 2. Specific examples include iron, nickel, cobalt, molybdenum, and chlorides and alloys of these. Further, these may be combined with or overlaid on aluminum, alumina, titania, titanium nitride, or silicon oxide.

In the present invention, the catalyst may be present in any range that has actually been used for CNT production. For example, when an iron or nickel metallic thin film is used, the thickness is preferably 0.1 nm to 100 nm, more preferably 0.5 nm to 5 nm, and particularly preferably 0.8 nm to 2 nm.

Reducing Gas

The reducing gas used in the formation step is a gas that is effective in at least one of the following. Reduction of the catalyst, promotion of the catalyst particle formation suited for CNT growth, and improvement of catalyst activity. The reducing gas used in the present invention may be appropriately selected from reducing gases that have actually been used for CNT production. For example, hydrogen, ammonia, water, and a mixed gas of these may be used.

Inert Gas (Atmosphere Gas)

In the present invention, the atmosphere gas (carrier gas) for the chemical vapor deposition may be appropriately selected from those actually used for CNT production, as long as it is inert at the CNT growth temperature and does not react with the growing CNTs. Generally, inert gas is preferred. Examples include helium, argon, hydrogen, nitrogen, neon, krypton, carbon dioxide, chlorine, and a mixed gas of these. Nitrogen, helium, argon, hydrogen, and a mixed gas of these are particularly preferred.

Feedstock (Feedstock Gas)

In the present invention, the feedstock used for the CNT production may be appropriately selected from substances actually used for CNT production and that contain a feedstock carbon element but does not contain an oxygen element at the growth temperature. It is known that oxygen-containing compounds such as ethanol and carbon monoxide can be used as the feedstock gas to produce CNTs. Generally, CNT production using ethanol, carbon monoxide, or other such compounds as the feedstock gas is far inferior to the producing method of the present invention in terms of, for example, growth rate and synthesis efficiency. The effects of the present invention cannot be obtained when such an oxygen-containing feedstock gas is used, because it greatly lowers the effect of the catalyst-activating substance. In the present invention, ethanol or carbon monoxide is used not as the feedstock gas, but as the catalyst-activating substance.

Examples of the feedstock gas include gaseous carbon compounds such as aromatic compounds, saturated hydrocarbons, unsaturated hydrocarbons, unsaturated cyclic hydrocarbons, saturated cyclic hydrocarbons, cyclic unsaturated hydrocarbons, and cyclic saturated hydrocarbons. Hydrocarbons such as methane, ethane, propane, butane, pentane, hexane, heptane, propylene, ethylene, butadiene, polyacetylene, and acetylene are particularly preferred. CNTs occur on the catalyst surface as a result of the feedstock gas contacting the catalyst in the growth step.

Atmosphere Pressure

The pressure of the CNT growing atmosphere is preferably from $10^4$ Pa to $10^6$ Pa (100 atm), more preferably from $5 \times 10^4$ Pa to $2 \times 10^5$ Pa (2 atmospheric pressure), particularly preferably from $9 \times 10^4$ Pa to $1.1 \times 10^5$ Pa. CNT production efficiency is very desirable under atmospheric pressure or pressure close to atmospheric pressure over the range of from $9 \times 10^4$ Pa to $1.1 \times 10^5$ Pa, outside a vacuum or a high pressure. This pressure range is also preferred in terms of mass production, because it allows the use of a producing apparatus of an open system that does not use a shutter or a valve.

Addition of Catalyst-Activating Substance

The catalyst-activating substance may be added in the CNT growth step. Adding the catalyst-activating substance extends the lifetime of the catalyst and improves the catalyst activity, and can thus improve the CNT production efficiency and the purity of CNTs.

The catalyst-activating substance used is an oxidative substance such as oxygen and sulfur, and does not cause serious damage to CNTs at growth temperature. Effective examples include water; oxygen; ozone; acidic gas; oxygen-containing compounds such as nitrogen oxide, and low-carbon oxygen-containing compounds such as carbon monoxide and carbon dioxide; alcohols such as ethanol, methanol, and isopropanol; ethers such as tetrahydrofuran; ketones such as acetone; aldehydes; acids; salts; amides; esters, and mixtures of these. Of these, water, oxygen, carbon dioxide, carbon monoxide, ethers, and alcohols are preferred. Water is particularly preferred for easy availability.

When the catalyst-activating substance is a carbon-containing substance, the carbon in the catalyst-activating substance can be a feedstock for CNTs.

Catalyst-Activating Substance and Feedstock Conditions

When producing CNTs using the catalyst-activating substance and feedstock in the growth step, it is important for efficient CNT production that (1) the feedstock contains carbon but does not contain oxygen, and (2) the catalyst-activating substance contains oxygen.

Reaction Temperature

The CNT growth reaction temperature is appropriately decided taking into consideration factors such as the metal catalyst, a feedstock carbon source, and the reaction pressure. However, when the step of adding a catalyst activator is included to eliminate by-products that cause catalyst deactivation, the reaction temperature is desirably set in a temperature range in which the catalyst activator can sufficiently develop its effect.

Specifically, an optimum temperature range is one in which a lower limit is the temperature that enables the catalyst-activating substance to remove by-products such as amorphous carbon and graphite, and in which an upper limit is the temperature at which the catalyst-activating substance does not oxidize the main product CNT.

Specifically, the reaction temperature is preferably 400° C. to 1,000° C. when water is used as the catalyst-activating substance. Less than 400° C., the catalyst-activating substance does not exhibit effects. Above 1,000° C., the catalyst-activating substance reacts with the CNT.

The reaction temperature is preferably 400° C. to 1,100° C. when carbon dioxide is used as the catalyst-activating substance. Less than 400° C., the catalyst-activating substance does not exhibit effects. Above 1,100° C., the catalyst-activating substance reacts with the CNT.

High-Carbon-Concentration Environment

The CNT growth rate is proportional to the number of the carbon atoms contained in the feedstock gas that comes into contact with the catalyst. That is, the growth rate increases as the proportion of the feedstock gas (feedstock concentration) with respect to the total flow amount increases, and the CNT production efficiency improves.

On the other hand, in the CNT production using the conventional synthesis technique that uses only the feedstock gas without the catalyst-activating substance, the carbon-based impurities that generate in the CNT growth step increase as the carbon concentration (feedstock concentration) becomes higher. Because the carbon-based impurities cover the catalyst particles and deactivate the catalyst, the conventional technique produces CNTs in a growth atmosphere (low carbon concentration environment) with an about 0.1 to 1% feedstock proportion with respect to the total flow amount. Accordingly, it has not been possible to improve the CNT production efficiency as intended.

In the producing method of the present invention adding the catalyst-activating substance, the catalytic activity greatly improves in the presence of the catalyst-activating substance, and CNTs can be grown for extended time periods, because the catalyst does not lose activity even in a feedstock concentration (high-carbon-concentration environment) with a feedstock gas proportion of about 2% to 20%, in excess of 1% with respect to the total flow amount. The CNT growth rate greatly improves under such a high-carbon-concentration environment, making it a preferred environment for producing a high-purity carbon nanotube assembly of a high specific surface area.

Specifically, adding the catalyst-activating substance has made it possible, for the first time, to produce high-purity CNTs at high speed, particularly a CNT assembly of single-walled CNTs of a high specific surface area under a high-carbon-concentration environment.

CNT Assembly

With the producing apparatus and method described above, CNTs can be efficiently produced from the catalyst on the base using the feedstock gas, in a high-carbon-environment, catalyst activating substance-containing atmosphere. The large numbers of CNTs grown from the catalyst align in a specific direction and form a CNT assembly. A CNT aligned assembly may be an object obtained by being detached from the base 1. In this case, the CNT assembly may be in the form of a powder.

Adhesion of the carbon impurities to the single-walled CNT assembly reduces the specific surface area of the single-walled CNT assembly. Because of the suppressed generation of the carbon impurities, the single-walled CNT assembly according to the present invention has a very large specific surface area of 800 $m^2/g$ to 2,600 $m^2/g$. The specific surface area of the CNT assembly can be determined by adsorption-desorption isotherm measurement with liquid nitrogen at 77 K. The large specific surface area makes the CNT assembly effective as a catalyst support or an energy and substance storage material, and is preferable for applications such as in supercapacitors and actuators.

An unopened CNT assembly with a specific surface area of less than 800 $m^2/g$, or an opened CNT assembly with a specific surface area of less than 1,300 $m^2/g$ possibly contains carbon impurities in several ten percent (about 40%) of the weight. This makes it difficult to develop the original CNT functions.

Desirably, the CNTs have as high a purity as possible to obtain the large specific surface area. As used herein, the purity means carbon purity. The carbon purity represents the percentage of the carbon in the weight of the CNT assembly, and can be determined by methods such as an elemental analysis using X-ray fluorescence. There is no upper limit in the carbon purity for obtaining the large specific surface area. However, for reasons related to production, it is difficult to obtain a CNT assembly with a carbon purity of 99.9999% or more. A carbon purity less than 95% makes it difficult to obtain a specific surface area above 800 m/g in unopened CNTs.

Orientation

The orientation of the single-walled CNT assembly can be evaluated based on, for example, Herman's orientation factor.

For example, a CNT aligned assembly with a Herman's orientation factor of greater than 0.1 and less than 1 as calculated by using an X-ray diffraction intensity obtained by a θ-2θ method or Laue method, or using an intensity profile obtained from an FFT image obtained by a fast Fourier transformation (FFT transformation) of an SEM image or an atomic force microscope (hereinafter, also referred to as "AFM") image is preferred in a variety of applications, because such CNT aligned assemblies have desirable electrical characteristics, desirable mechanical characteristics, and desirable heat characteristics, in addition to having thermodynamic, electric, and mechanical anisotropy.

The alignment direction is an average of directional vectors of the individual single-walled CNTs forming the single-walled CNT assembly. Accordingly, the alignment direction may vary depending on a location of the single-walled CNT assembly, and the size of a region where orientation is evaluated. For quantitative determination of the alignment direction, an FFT image should be used that is obtained by the fast Fourier transformation of, for example, an SEM image of the single-walled CNT assembly. The FFT image of the oriented single-walled CNT assembly appears as a flat ellipsoid, which becomes flatter as the degree of orientation increases. The long axis direction of the ellipsoid is the direction in which the orientational periodicity of the single-walled CNTs becomes maximum, and the short axis direction of the ellipsoid represents the alignment direction in a field of an original image of the FFT image. The reference direction for the calculation of the Herman's orientation factor is the long axis direction of the ellipsoid.

The CNT assembly alignment can be evaluated by using at least one of the following methods.

1. In the measurement of X-ray diffraction intensity (θ-2θ method) with the incident X-rays from the first direction parallel to the CNT longitudinal direction and from the second direction orthogonal to the first direction, there exist a θ angle and reflection azimuth at which the reflection intensity from the second direction exceeds the reflection intensity from the first direction, and a θ angle and reflection azimuth at which the reflection intensity from the first direction exceeds the reflection intensity from the second direction.

2. A diffraction peak pattern indicative of the presence of anisotropy appears in the measurement of X-ray diffraction intensity (Laue method) in a two-dimensional diffraction pattern image obtained by the incident X-rays from a direction orthogonal to the CNT longitudinal direction.

3. Herman's orientation factor is greater than 0.1 and less than 1, more preferably 0.25 or greater and less than 1 in the X-ray diffraction intensity obtained by the θ-2θ method or Laue method.

EXAMPLES

The following describes the present invention in more detail based on specific Examples. The present invention, however, is not limited by the following Examples.

Example 1

Figure 6:
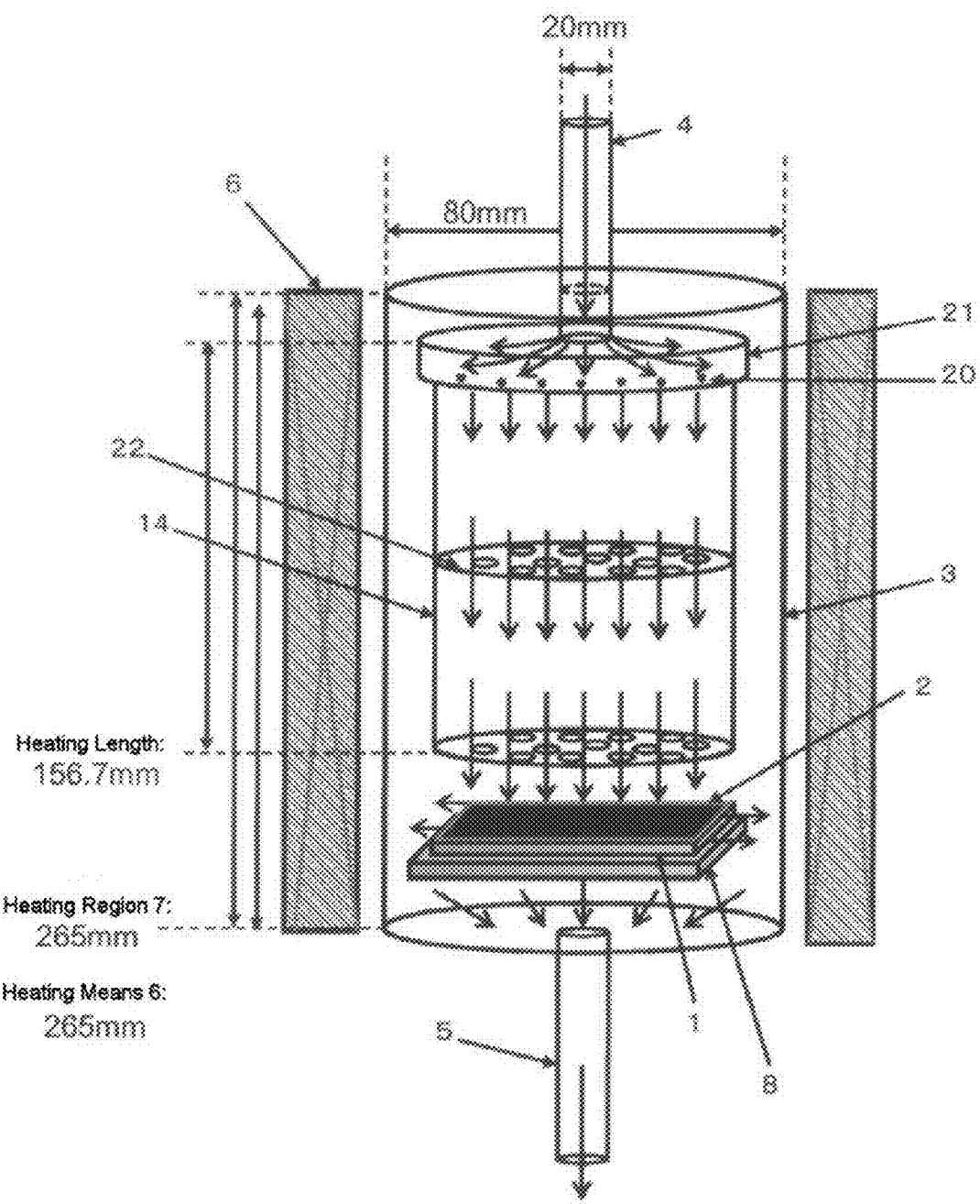
FIG. 6 is a diagram schematically representing a CNT producing apparatus of Example 1.

A CNT assembly and a CNT aligned assembly were produced by using the CNT producing apparatus shown in FIGS. 1 and 6, and a method similar to the producing method described above. Descriptions will be given with reference to FIGS. 1, 2, and 6.

A quartz tube (inner diameter, 80 mm) such as a cylinder was used as the vertical synthesis furnace 3. The heating means 6 and the heating region 7 had a length of 265 mm. The base holder 8 made of quartz was provided 20 mm downstream from a horizontal position at the center. The base holder 8 was horizontally installed to allow the flat base 1 to be placed thereon.

The gas supply pipe 4 made of a heat-resistant alloy and having a diameter of 22 mm (inner diameter, 20 mm) was provided through the upper wall of the synthesis furnace 3 by being vertically inserted through the opening provided through the upper wall of the synthesis furnace 3. The gas exhaust pipes 5 were provided through the bottom wall by being vertically inserted through openings provided through the bottom wall at the center of the synthesis furnace 3. The heating means 6 realized by a resistance heating coil was provided around the synthesis furnace 3 along with the heating means 6 and the heat temperature adjusting means, so as to specify the heating region 7 in the synthesis furnace 3 heated to a predetermined temperature (the heating means 6 had a full-length of 265 mm, and the heating region 7 had a length of 265 mm).

Gas flow forming means 21 realized by a heat-resistant alloy Inconel 600 of a cylindrical flat hollow structure with a diameter of 60 mm was connected to the gas supply pipe 4 in communication with an end portion thereof inside the synthesis furnace 3. The gas supply pipe 4 was connected to the center of the gas flow forming means 21 in communication therewith.

The gas flow forming means 21 was arranged within the same plane substantially parallel to the surface of the base 1, with the center of the base 1 coinciding with the center of the gas flow forming means 21. The gas flow forming means 21 was provided with the gas blowing means 20 realized by a plurality of blow holes having a pore size of 0.5 mm. The gas flow forming means 21 is columnar in shape with a hollow structure, and had a surface size of, for example, 60.0 mm×16.7 mm. The diameter of the gas blowing means 20 was 0.5 mm, and a total of 82 gas blowing means 20 were provided.

The blow holes of the gas blowing means 20 were provided over the catalyst layer 2 on the base 1, and the feedstock gas was ejected onto the catalyst substantially vertically to the surface of the base 1. As used herein, the "over the catalyst layer 2" refers to a position where an ejection axis lines of the blow holes create an angle of 0° or more and less than 90° with a normal line of the base. The distance between the gas blowing means 20 and the opposing catalyst surface was 140 mm.

The feedstock gas supplied into the synthesis furnace 3 at one location through the gas supply pipe 4 is diffused and distributed, and forms feedstock gas flows in all directions over 360° angle on a plane substantially parallel to the surface of the base 1. The feedstock gas then contacts the surface of the catalyst layer 2 on the base 1 substantially vertically to the surface of the base 1.

Here, the gas flow forming means 21 and the gas blowing means 20 are deliberately separated from the catalyst surface by a distance of 140 mm to increase the heat volume 15, and the residence time adjusting means 14 is provided in a heat volume 15 space. The residence time adjusting means 14 includes two current boards of a heat-resistant alloy (Inconel 600) that realize the turbulence preventing means 22 connected to the gas flow forming means 21 and include 8 holes (φ=4 mm) for the first layer and 101 holes (φ=0.5 mm) for the second layer. The 140-mm distance separating the gas flow forming means 21 and the gas blowing means 20 from the catalyst surface is defined as the length of the residence time adjusting means 14. In the present apparatus, the length of the residence time adjusting means 14 coincides with the distance to the gas blowing means 20 provided for the gas flow forming means 21 provided opposite the catalyst surface.

The carbon weight flux adjusting means 13 was configured by connecting to the gas flow unit the feedstock gas cylinder 9 that supplies the CNT feedstock carbon compound, and, as required, the catalyst-activating substance cylinder 10, the atmosphere gas cylinder 11 that supplies the carrier gas of the feedstock gas and the catalyst-activating substance, and the reducing gas cylinder 12 for reducing the catalyst. These materials were supplied to the gas supply pipe 4 while independently controlling the supply amounts, so as to control the supply amount of the feedstock gas.

An adjustable range of carbon weight flux is 0 g/cm$^2$/min to 1,000 g/cm$^2$/min in the configuration of the present apparatus. However, the carbon weight flux can be appropriately adjusted over a wider range with a gas flow unit that has appropriate supply amounts.

Heat Volume Specification

In the configuration of the present apparatus, the residence time adjusting means 14 has a length of 140 mm, and the heat volume 15 is specified as 444 cm$^3$ (residence time adjusting means 14 volume 396.2 cm$^3$ (cross sectional area 28.3 cm$^2$× distance 14 cm)+gas flow forming means 21 volume 47.3 cm$^3$ (cross sectional area 28.3 cm$^2$×height 1.67 cm)).

The base 1 and the base holder 8 are installed 20 mm downstream from a horizontal position at the center of the heating region 7, and therefore the evacuation volume 16 is 318 cm$^3$ (feedstock gas channel cross sectional area 28.3 cm$^2$×heating region 7 distance 26.5 cm/2−2 cm=11.3 cm)), smaller than the heat volume 15.

As the base 1, a catalyst-sputtered (Al$_2$O$_3$ 30 nm, Fe 1.8 nm), 40 mm×40 mm Si base with a 500 nm-thick thermally-oxidized film was used.

The base 1 was installed on the substrate holder 8 installed 20 mm downstream of a horizontal position at the center of the heating region 7 in the synthesis furnace 2 (installing step). The substrate 1 was horizontally installed. In this way, the catalyst on the substrate crosses the channel of the feedstock gas substantially vertically to enable the feedstock gas to be efficiently supplied to the catalyst.

While introducing a mixed gas of He: 200 sccm and H$_2$: 1,800 sccm as the reducing gas (total flow rate: 2,000 sccm), the temperature inside the synthesis furnace 3 at a furnace pressure of 1.02×10$^5$ Pa was raised from room temperature to 810° C. in 15 min using the heating means 6, and the base with the catalyst was also heated for 3 min at the maintained temperature of 810° C. (formation step). As a result, the iron catalyst layer was reduced, and formation of particles suited for single-walled CNT growth was promoted, forming large numbers of nanometer-sized catalyst particles on the alumina layer.

Then, with the synthesis furnace temperature set to 810° C. at the furnace pressure of 1.02×10$^5$ Pa (atmospheric pressure), atmosphere gas He: total flow rate ratio 84% (1,680 sccm), feedstock gas C$_2$H$_4$: total flow rate ratio 10% (200 sccm), H$_2$O-containing He (catalyst-activating substance; relative humidity of 23%): total flow rate ratio 6% (120 sccm) were supplied at a total flow rate of 2,000 sccm (growth step) so that the carbon weight flux is 192 g/cm$^2$/min. The residence time in the furnace was 7 seconds.

After the foregoing procedures, single-walled CNTs grew from each catalyst particle (growth step), and an aligned single-walled CNT assembly was obtained. The CNTs were grown on the base 1 in this manner in the catalyst-activating substance-containing, high-carbon environment.

After the growth step, only the atmosphere gas was supplied for 3 min (total flow rate of 4,000 sccm) to eliminate the remaining feedstock gas, the generated carbon impurities, and the catalyst activator (carbon impurity adhesion suppressing step, flushing step).

Thereafter, the substrate was cooled to 400° C. or less, and was taken out of the synthesis furnace 3 (cooling step, substrate removing step) to finish the series of single-walled CNT assembly producing steps.

CNT Assembly Growth Rate

The growth rate of the CNT assembly was 620 µm/min. Given that the CNT growth rate reported so far in publications such as in Appl. Phys. Lett. Vol. 93, p. 143115, 2008 is merely about 200 µm/min, it can be said that the apparatus configuration and the method of the present invention are very effective at producing an aligned CNT assembly at high speed.

The present producing method has a yield of 7.6 mg/cm$^2$, compared to about 1.5 to 2.0 mg/cm$^2$ in the conventional synthesis apparatuses and producing methods that do not use the residence time adjusting means. It can therefore be said that the apparatus configuration and the producing method of the present invention are very effective at producing a CNT assembly at high efficiency. It can also be said that the apparatus configuration and the producing method of the present invention, capable of producing a CNT assembly of a substantially uniform height over the surface of the catalyst layer 2 on the base 1, are very effective at efficiently producing a CNT assembly over a large area in a substantially uniform fashion.

Figure 7:
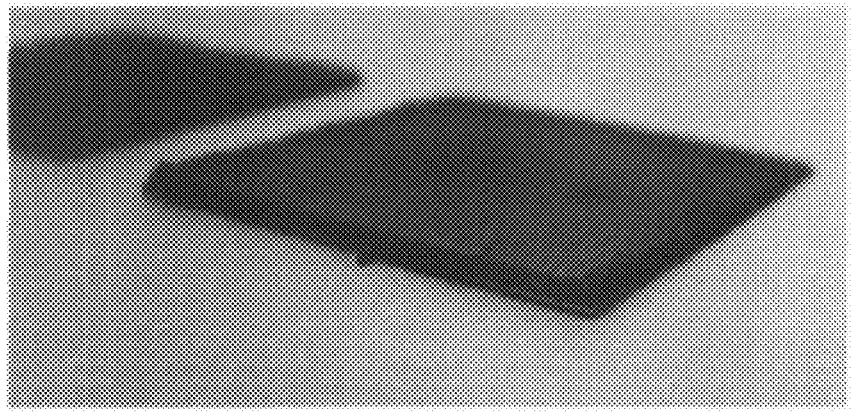
FIG. 7 is a photographic representation showing an example of a CNT aligned assembly produced in Example 1.

FIG. 7 is a photographic representation of an example of a CNT aligned assembly produced in this Example.

Example 2

In this Example, the procedures of Example 1 were performed with a different furnace and base 1. Descriptions will be given with reference to FIGS. 1, 2, and 6. A catalyst-sputtered (Al$_2$O$_3$ 30 nm, Fe 1.8 nm), 20 mm×20 mm base 1 with a 500 nm-thick foil (material, YEF426; thickness, 0.3 mm) was installed as the base 1 in a quartz tube synthesis furnace 3 (inner diameter, 80 mm; cross sectional area, 5,024 mm$^2$; full-length, 550 mm). The full-lengths of the heating means 6 and the heating region 7 were 420 mm. The distance down to the base 1 from a horizontal position at the center of the heating means 6 was 120 mm, and the gas exhaust pipe 5 was installed 5 cm into the heating region 7. The gas flow forming means 21, the gas blowing means 20, and the residence time adjusting means 14 were provided as in Example 1. The distance between the gas blowing means 20 and the opposing catalyst surface was 140 mm. This distance is defined as the length of the residence time adjusting means 14.

The structural materials in other parts of the producing apparatus, the flow rate ratio of each gas in other steps, and other procedures are as described in Example 1.

The gas supply pipe 4 is installed air-tight into the synthesis furnace 3 using a Wilson seal. The length and volume of the residence time adjusting means 14, specifically, the heat volume 15 can be adjusted by moving the gas supply pipe 4 up and down with hand.

When the length of the residence time adjusting means 14 is 140 mm, the heat volume 15 is 505 cm$^3$ (residence time adjusting means 14 volume 396.2 cm$^3$ (cross sectional area 28.3 cm$^2$×distance 14 cm)+gas flow forming means 21 volume 56.6 cm$^3$ (cross sectional area 28.3 cm$^2$×height 2 cm)+ gas supply pipe 4 volume 52.7 cm$^3$ (cross sectional area 3.1 cm$^2$×length 42/2+12−6=17 cm)).

When the length of the residence time adjusting means 14 is 40 mm, the heat volume 15 is 253 cm$^3$ (residence time adjusting means 14 volume 113.2 cm³ (cross sectional area 28.3 cm²×distance 4 cm)+gas flow forming means 21 volume 56.6 cm³ (cross sectional area 28.3 cm²×height 2 cm)+gas supply pipe 4 volume 83.7 cm³ (cross sectional area 3.1 cm²×length 42/2+12−6=27 cm)).

The evacuation volume 16 is 113 cm³ (feedstock gas channel cross sectional area 28.3 cm²×length on the evacuation side 42/2−12−5=4 cm), smaller than the heat volume 15.

Figure 8:
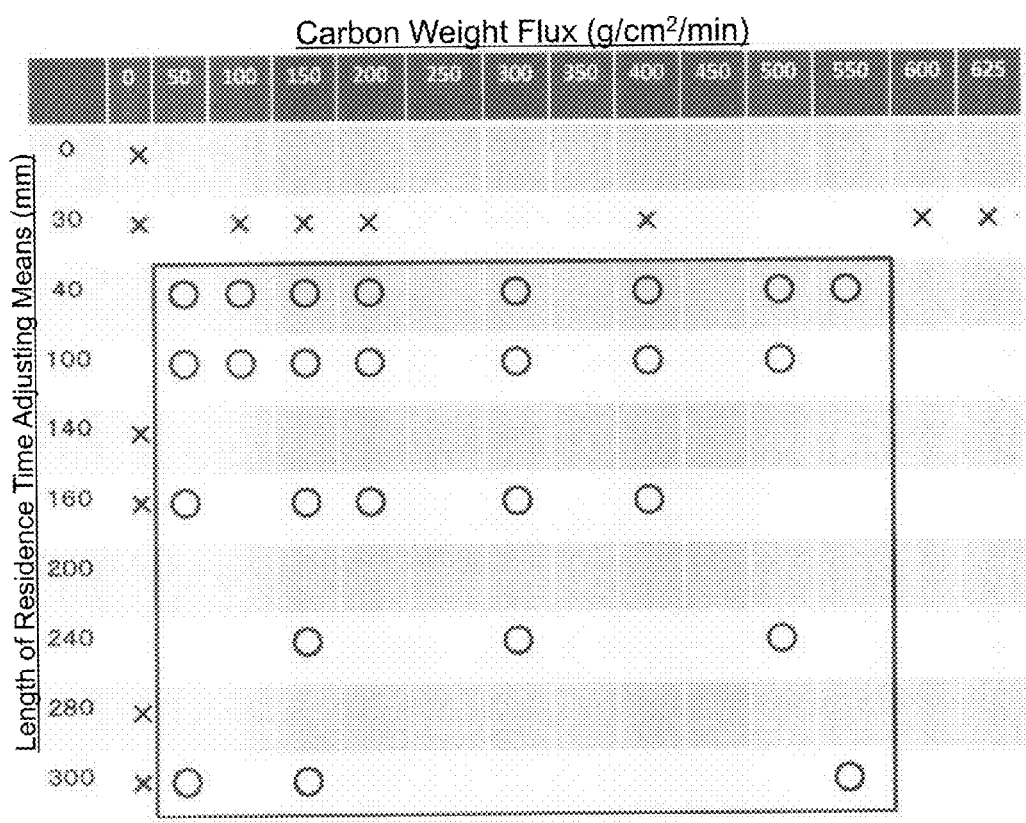
FIG. 8 is a diagram representing an example of the results of CNT growth under varying heating lengths and carbon weight fluxes.

FIG. 8 represents the results of the CNT assemblies produced with varying lengths of the residence time adjusting means 14 and varying carbon weight fluxes using the residence time adjusting means 14 and the carbon weight flux adjusting means 13 of the producing apparatuses of Examples 1 and 2. The same apparatus configurations and producing steps used in Examples 1 and 2 were used, except for the residence time adjusting means length and the carbon weight flux.

In the figure, open circles mean efficient production of a high-purity CNT assembly at high speed and at high yield with a yield of 3 mg/cm² or more, a growth rate of 200 μm/min or more, and a specific surface area of 1,000 m²/g or more. Crosses means any of these conditions was not satisfied.

It can be seen from Example 2 that a high-purity CNT aligned assembly can be efficiently produced at high speed and at high yield when the length of the residence time adjusting means is at least 40 mm. There is no particular upper limit for the length of the residence time adjusting means. In Example 2, fast, high-yield, efficient production of a high-purity CNT assembly was confirmed up to the length of 300 mm. It can also be seen that a high-purity CNT aligned assembly can be efficiently produced at high speed and at high yield when the carbon weight flux falls in the range of from 50 g/cm²/min to 550 g/cm²/min.

Example 3

Figure 9:
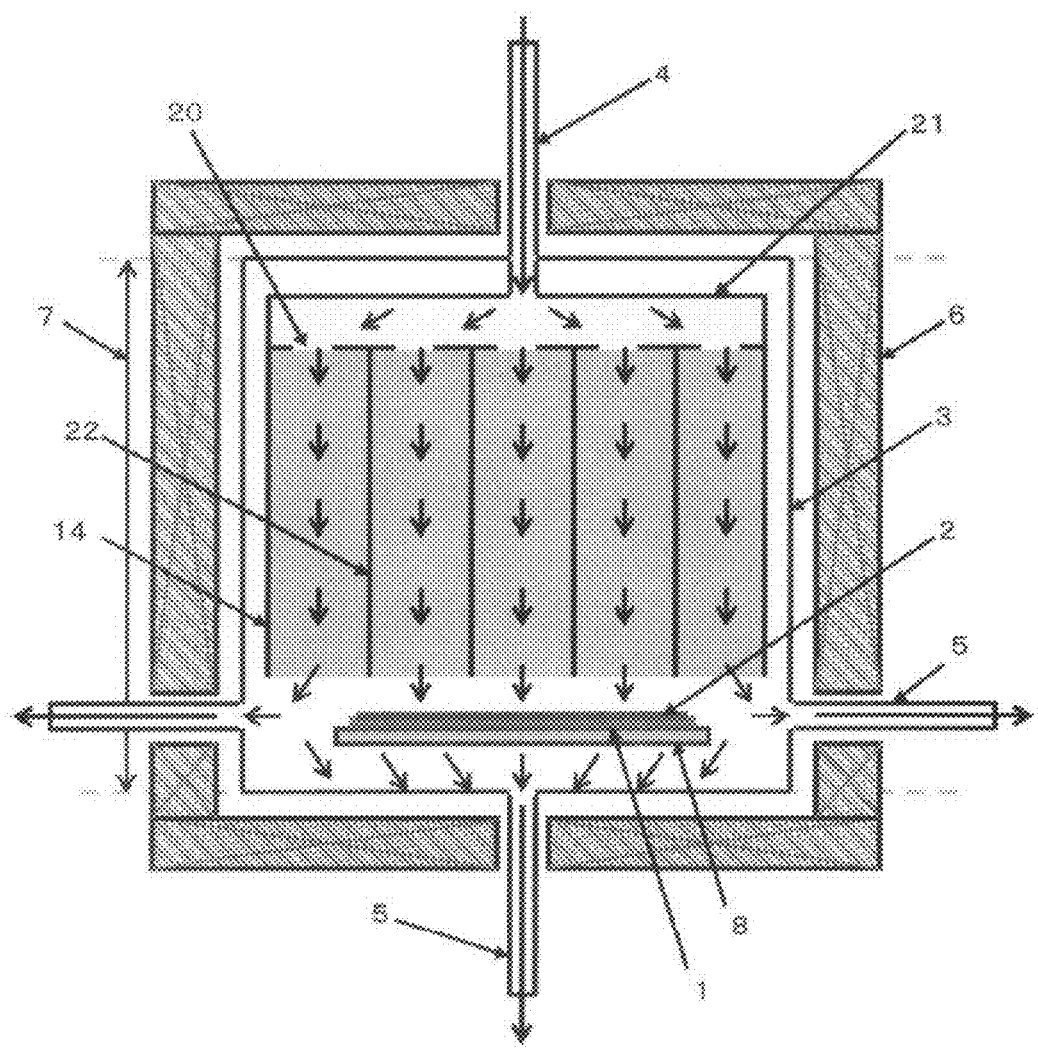
FIG. 9 is a diagram schematically representing another example of a CNT producing apparatus to which the present invention is applicable.

In this Example, as illustrated in FIG. 9, a CNT producing apparatus is described in which the turbulence preventing means 22 in the residence time adjusting means 14 is configured from a plurality of hollow members or tubular members such as a bee-nest assembly or a honeycomb with a plurality of pipes.

In the residence time adjusting means 14 of this Example, the plurality of hollow members or tubular members extend along the direction of the feedstock gas. The residence time adjusting means 14 of this Example thus forms a plurality of turbulence-suppressed gas flows extending along the direction of the feedstock gas.

As to the other parts of the producing apparatus and the carbon producing method, the same producing apparatus and method described in Example 1 can be used, and detailed descriptions thereof are omitted. The producing apparatus of this Example has a narrow cross sectional area for the feedstock gas channel in each gas flow channel, and thus allows the feedstock gas to flow in the residence time adjusting means 14 while suppressing turbulence. This makes it possible to provide substantially the same residence time while increasing the residence time.

Example 4

Figure 10:
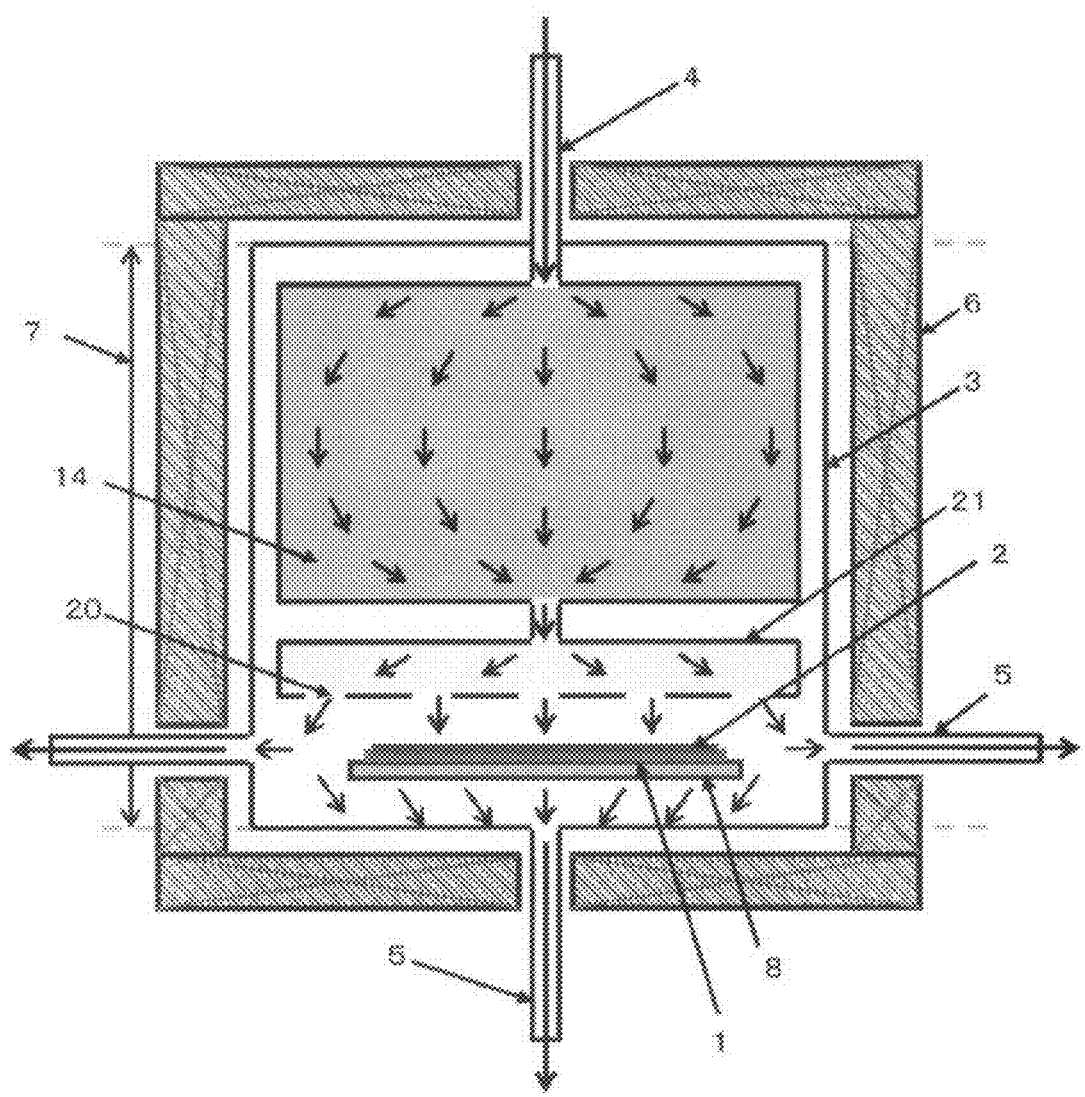
FIG. 10 is a diagram schematically representing another example of a CNT producing apparatus to which the present invention is applicable.

In this Example, as illustrated in FIG. 10, a CNT producing apparatus is described in which the residence time adjusting means 14 has a hollow structure (gas retaining means) with a large heat volume 15. The gas flow forming means 21 and the gas blowing means 20 provided for the gas flow forming means 21 are separated from the opposing catalyst layer 2 surface by a distance of less than 40 mm, and the residence time adjusting means 14 is provided in communication with and between the gas supply pipe 4 and the gas flow forming means 21 in the heating region 7.

As to the other parts of the producing apparatus and the carbon producing method, the same producing apparatus and method described in Example 1 can be used, and detailed descriptions thereof are omitted.

In this Example, the positional relationship between the gas blowing means 20 provided for the gas flow forming means 21 and the surface of the catalyst layer 2 remains fixed even when the heat volume 15 of the residence time adjusting means 14 is increased or adjusted. The feedstock gas can thus be easily supplied to the surface of the catalyst layer 2 in a substantially uniform amount.

Example 5

Figure 11:
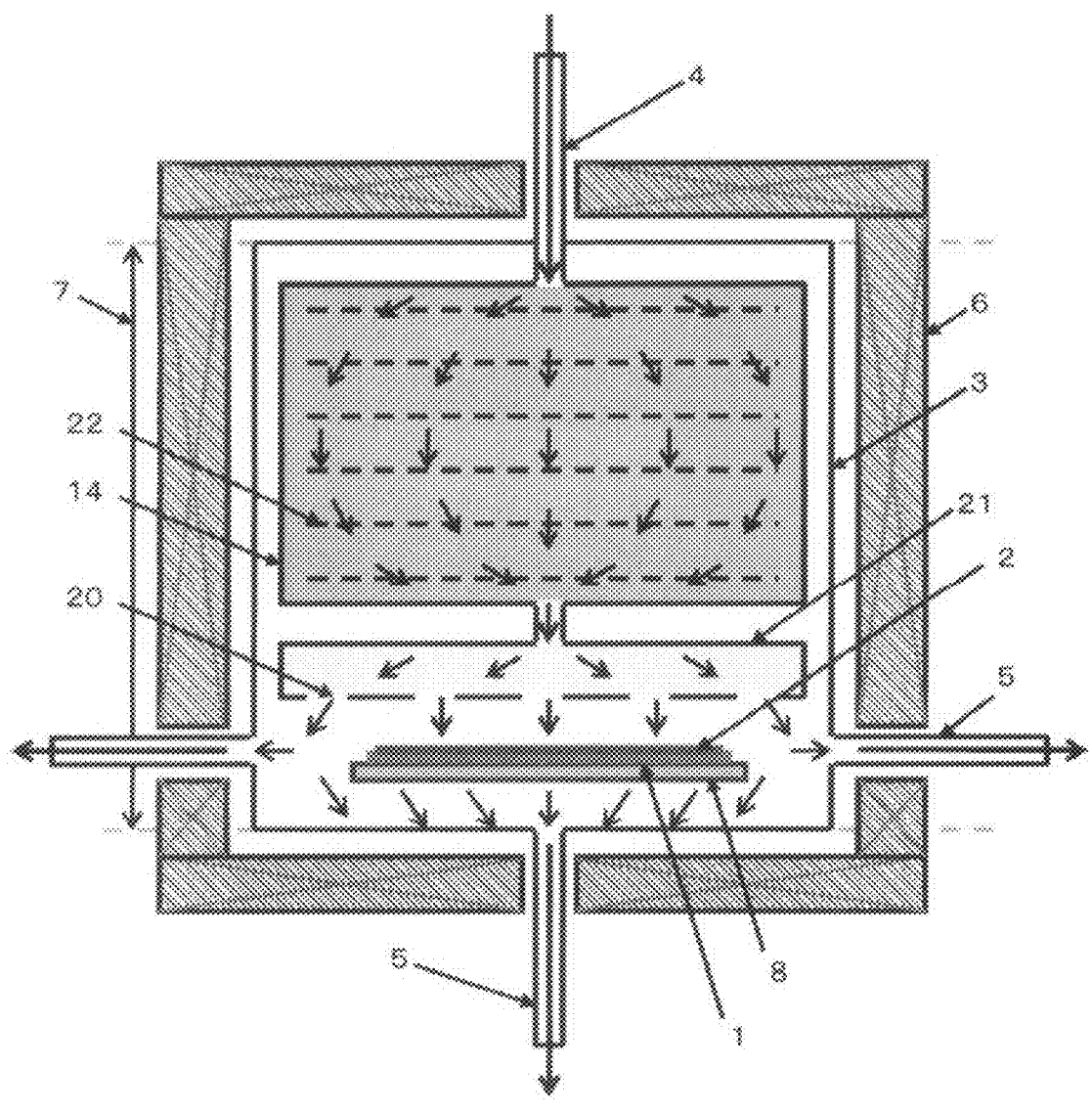
FIG. 11 is a diagram schematically representing another example of a CNT producing apparatus to which the present invention is applicable.

In this Example, as illustrated in FIG. 11, a CNT producing apparatus is described in which the turbulence preventing means 22 is provided in the residence time adjusting means 14 of the hollow structure with the large heat volume 15 used in Example 4. As to the other parts of the producing apparatus and the carbon producing method, the same producing apparatus and method described in Example 1 can be used, and detailed descriptions thereof are omitted.

The CNT producing apparatus of this Example makes it easier to suppress turbulence in the residence time adjusting means 14, and to contact the feedstock gas to the catalyst after substantially the same residence time. Further, the positional relationship between the gas blowing means 20 provided for the gas flow forming means 21 and the surface of the catalyst layer 2 remains fixed even when the heat volume 15 of the residence time adjusting means 14 is increased or adjusted. The feedstock gas can thus be easily supplied to the surface of the catalyst layer 2 in a substantially uniform amount.

Example 6

Figure 12:
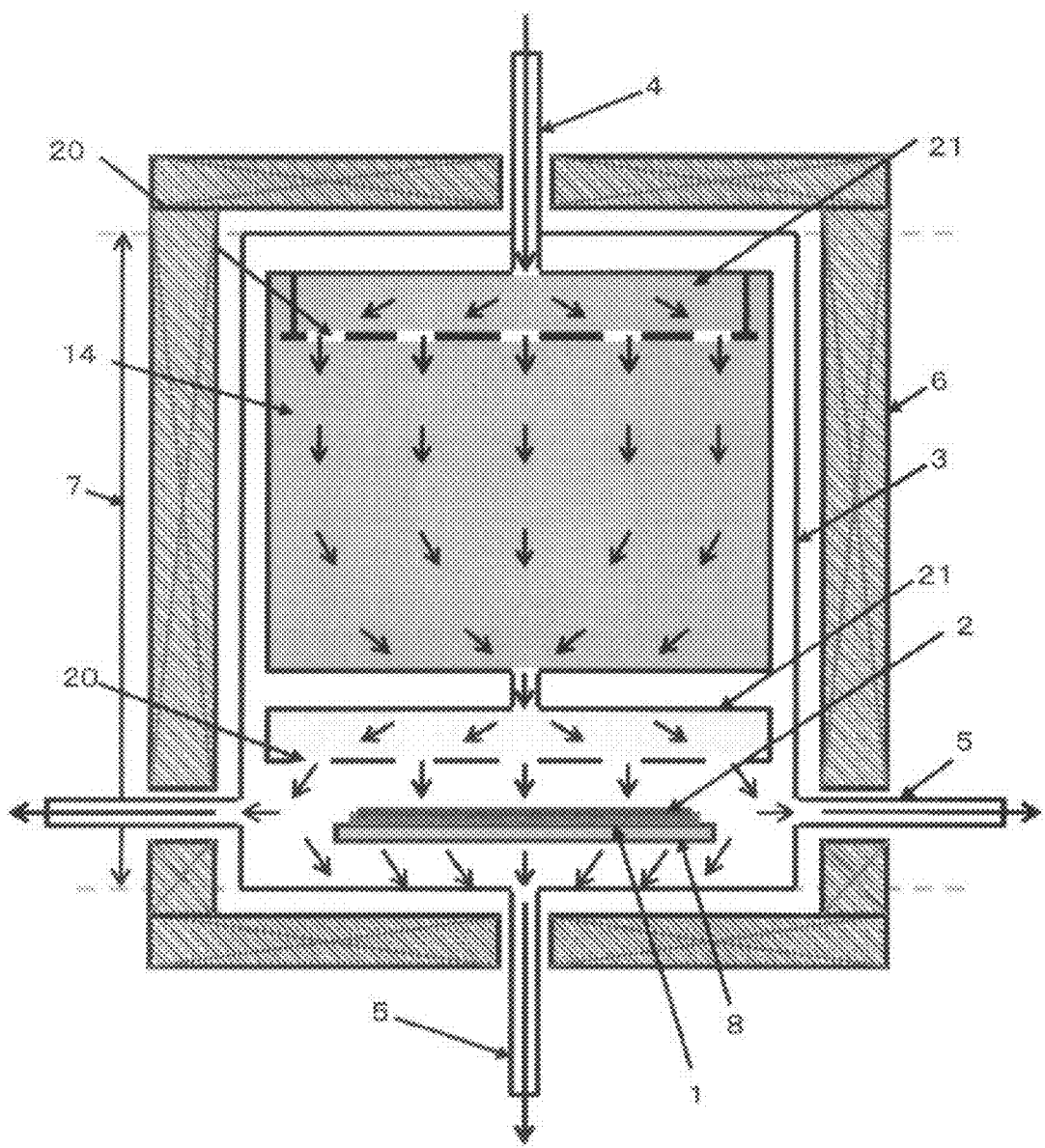
FIG. 12 is a diagram schematically representing another example of a CNT producing apparatus to which the present invention is applicable.

In this Example, as illustrated in FIG. 12, a CNT producing apparatus is described in which the gas flow forming means 21 and the gas blowing means 20 are provided in the residence time adjusting means 14 of the hollow structure with the large heat volume 15 used in Example 4. As to the other parts of the producing apparatus and the carbon producing method, the same producing apparatus and method described in Example 1 can be used, and detailed descriptions thereof are omitted.

The CNT producing apparatus of this Example has effect in contacting the feedstock gas to the catalyst after substantially the same residence time by providing more uniform flows of the feedstock gas in the residence time adjusting means 14. Further, the positional relationship between the gas blowing means 20 provided for the gas flow forming means 21 and the surface of the catalyst layer 2 remains fixed even when the heat volume 15 of the residence time adjusting means 14 is increased or adjusted. The feedstock gas can thus be easily supplied to the surface of the catalyst layer 2 in a substantially uniform amount.

Example 7

Figure 13:
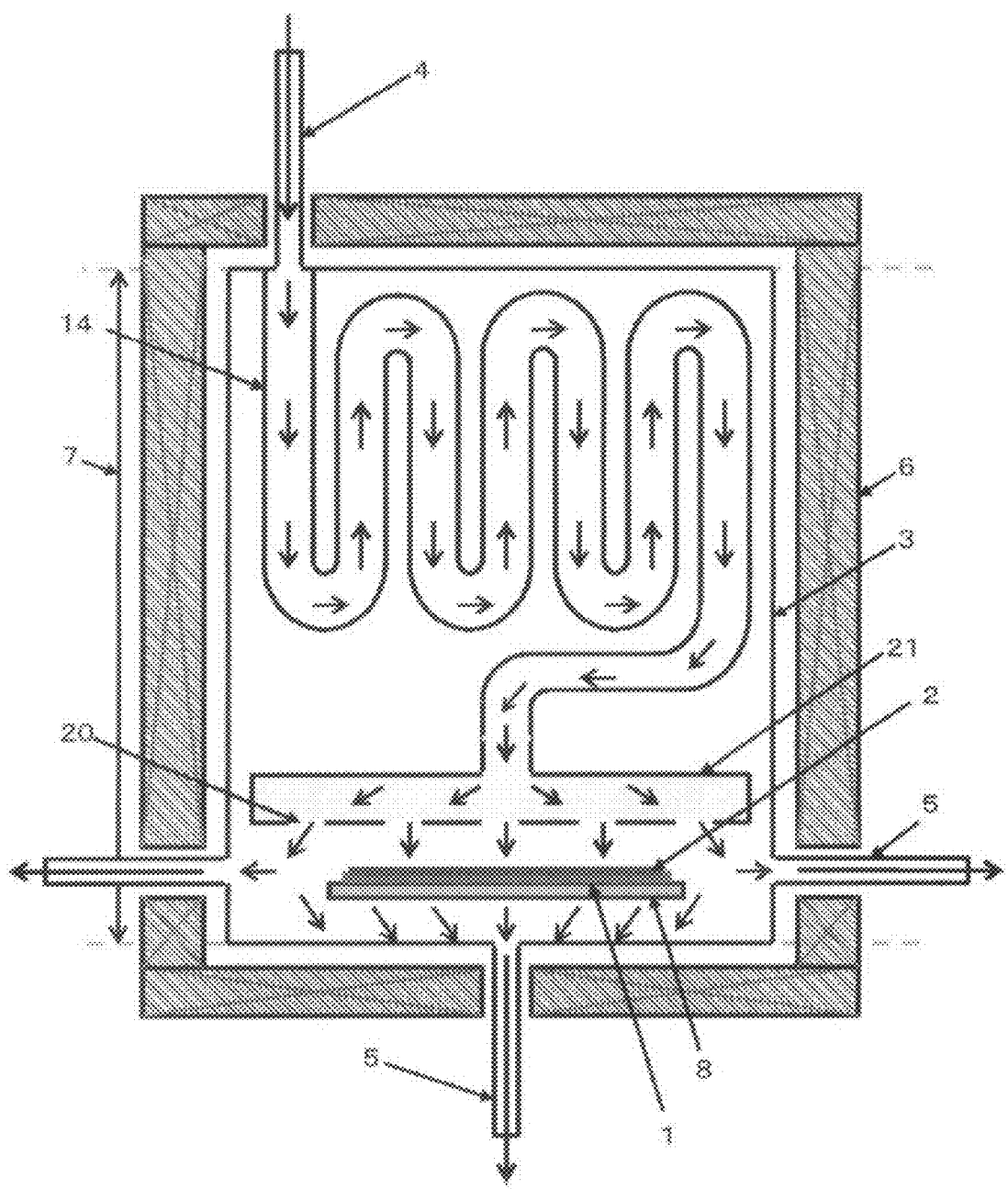
FIG. 13 is a diagram schematically representing another example of a CNT producing apparatus to which the present invention is applicable.

In this Example, as illustrated in FIG. 13, a CNT producing apparatus is described in which the residence time adjusting means 14 of a large heat volume 15 is realized as a tubular gas pipe having a cross sectional area that does not generate a turbulence. The gas flow forming means 21 and the gas blowing means 20 provided for the gas flow forming means 21 used in Example 1 are separated from the opposing catalyst layer 2 surface by a distance of less than 40 mm, and the residence time adjusting means 14 is provided in communication with and between the gas supply pipe 4 and the gas flow forming means 21 in the heating region 7.

In the residence time adjusting means 14, the feedstock gas channel has a narrow cross sectional area, and allows the feedstock gas to pass the residence time adjusting means 14 while suppressing turbulence. This makes it possible to provide substantially the same residence time while increasing the residence time. Specifically, the residence time adjusting means 14 in the CNT producing apparatus of this Example has the turbulence preventing means 22. In the CNT producing apparatus of this Example, the positional relationship between the gas blowing means 20 provided for the gas flow forming means 21 and the surface of the catalyst layer 2 remains fixed even when the heat volume 15 of the residence time adjusting means 14 is increased or adjusted. The feedstock gas can thus be easily supplied to the surface of the catalyst layer 2 in a substantially uniform amount.

Example 8

Figure 14:
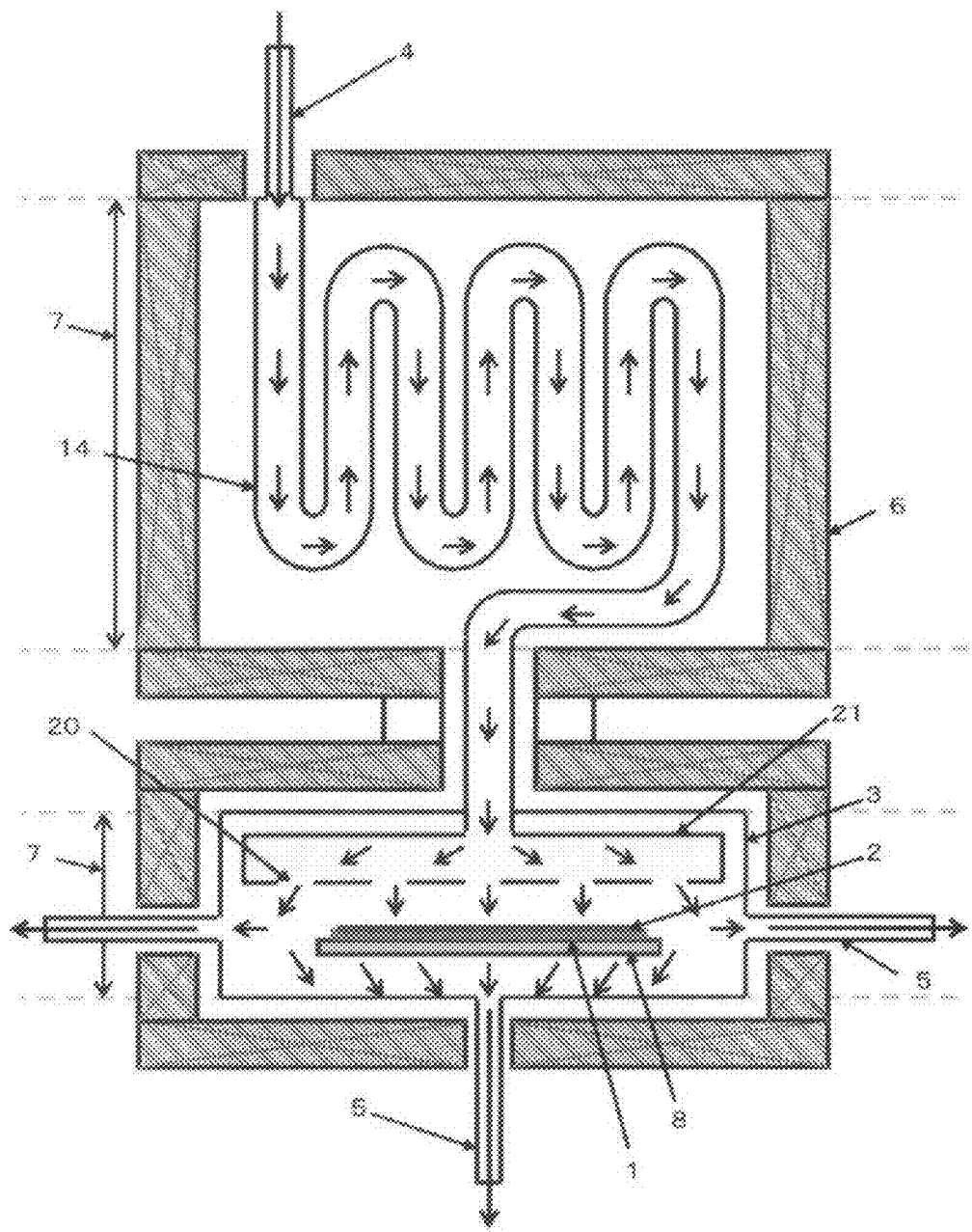
FIG. 14 is a diagram schematically representing another example of a CNT producing apparatus to which the present invention is applicable.
Figure 15:
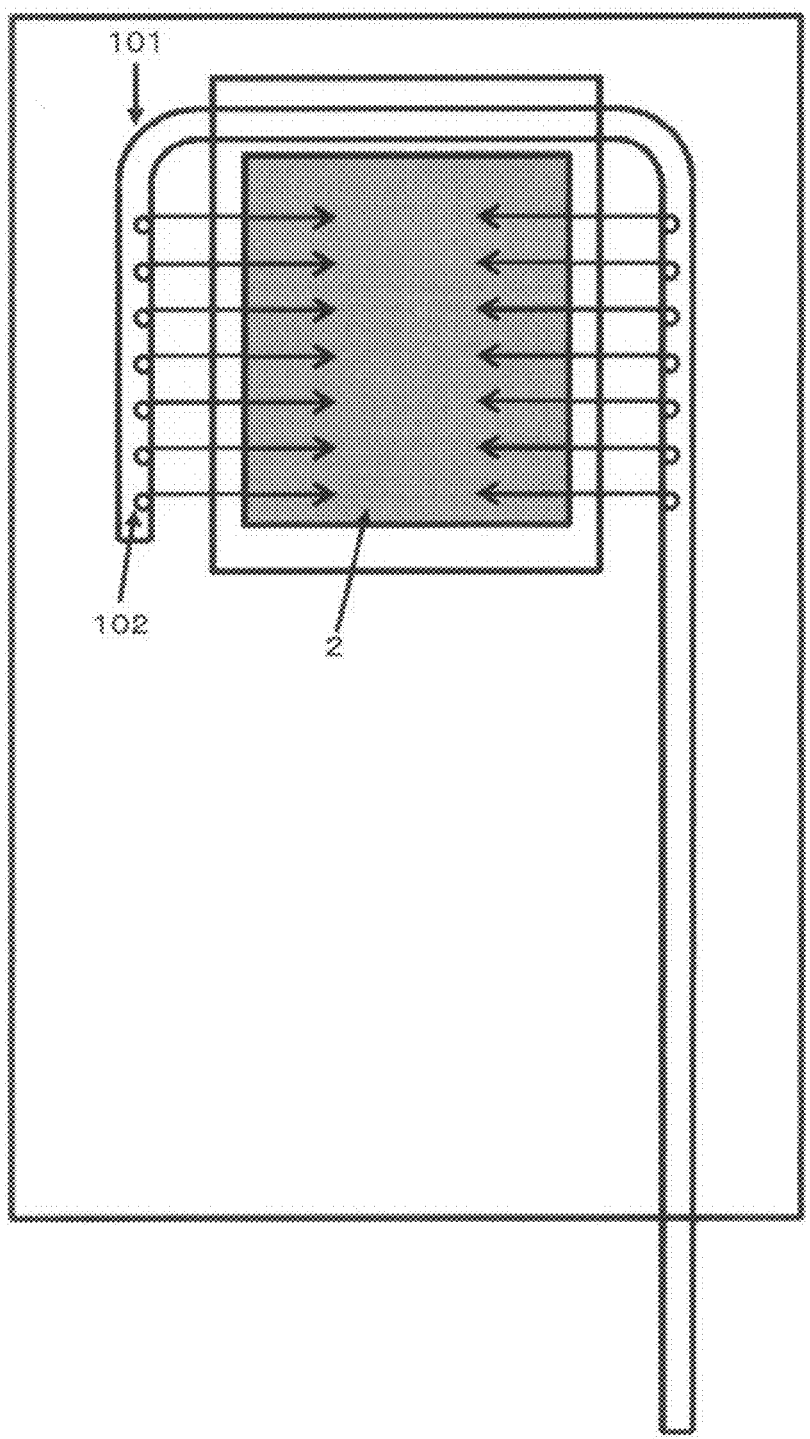
FIG. 15 is a diagram schematically representing a conventional CNT producing apparatus.

In this Example, as illustrated in FIG. 14, a CNT producing apparatus is described in which the residence time adjusting means 14 of a large heat volume 15 is realized as a tubular gas pipe having a cross sectional area that does not generate a turbulence, or in which the residence time adjusting means 14 of a hollow structure (gas retaining means) with a large heat volume 15 is provided. The gas flow forming means 21 and the gas blowing means 20 provided for the gas flow forming means 21 used in Example 1 are separated from the opposing catalyst layer 2 surface by a distance of less than 40 mm, and the residence time adjusting means 14 is provided in a heating furnace provided outside of the synthesis furnace 3, and in communication with and between the gas supply pipe 4 and the gas flow forming means 21. The heating furnace and the synthesis furnace 3 may be independently controlled (heated).

By raising and lowering the temperature of the heating furnace, decomposition of the feedstock gas can be effectively controlled, and substantially the same effect obtained by adjusting the residence time can be obtained.

In the CNT producing apparatus of this Example, the residence time adjusting means 14 is arranged outside of the synthesis furnace 3, and thus the synthesis furnace 3 can be reduced in size. Further, a plurality of heating partitions that can be independently controlled (heated) may be provided in the synthesis furnace 3, and may be controlled to increase or decrease the number of heated partitions and/or to increase or decrease temperature. The heat volume 15 and/or residence time also can be adjusted in this manner. Further, the positional relationship between the gas blowing means 20 provided for the gas flow forming means 21 and the surface of the catalyst layer 2 remains fixed even when the heat volume 15 of the residence time adjusting means 14 is increased or adjusted. The feedstock gas can thus be easily supplied to the surface of the catalyst layer 2 in a substantially uniform amount.

The producing apparatus of the present invention may be realized by appropriately combining the specific forms and means described in the foregoing Examples 1 to 8.

Properties of CNTs Produced in Examples 1 and 2

The properties of the single-walled CNT assembly depend on specific producing conditions. Under the producing conditions of Examples 1 and 2, the CNT assembly typically has a single-walled CNT content of 99% (the number proportion of the single-walled CNTs with respect to double layer CNTs and multilayer CNTs, determined from an image of a synthesized single-walled CNT assembly observed under a transmission electron microscope), a weight density of 0.03 g/cm$^3$, a BET-specific surface area of 1,150 m$^2$/g, a carbon purity of 99.9%, and a Herman's orientation factor of 0.7.

CNT Assembly Raman Spectrum Evaluation

A Raman spectrum of the CNT assembly obtained in Example 1 was measured. A sharp G band peak was observed near 1,590 Kayser, which suggested the presence of a graphite crystalline structure in the CNTs forming the CNT assembly of the present invention.

A D band peak attributed to defect structures was observed near 1,340 Kayser, suggesting that the CNTs contained significant defects. Further, an RBM mode attributed to a plurality of single-walled CNTs, observed on the low-wavelength side (100 to 300 Kayser) suggested that this graphite layer was a single-walled CNT.

Specific Surface Area of CNT Assembly

A 50-mg mass was removed from the CNT assembly detached from the substrate, and was used for a measurement of liquid nitrogen adsorption-desorption isotherm at 77 K using BELSORP-MINI available from Bell Japan, Inc. (adsorption equilibrium time was 600 sec). The specific surface area was 1,150 m$^2$/g as measured from the adsorption-desorption isotherm using a Brunauer, Emmett, Teller method.

The adsorption-desorption isotherm of the unopened CNT assembly showed high linearity in a region with the relative pressure of 0.5 or less. $\alpha_s$ plot also showed high linearity in a region with the relative pressure of 1.5 or less. These results suggest that the CNTs forming the CNT assembly are unopened.

The specific surface area of the same CNT assembly was measured according to a method described in Nano Letters, Vol. 2 (2002), pp. 385 to 388. The total specific surface area was 1,149 m$^2$/g with an outer surface area of 1,090 m$^2$/g and an inner surface area of 59 m$^2$/g.

Purity of CNT Assembly

The carbon purity of the CNT assembly was determined from the result of elemental analysis using X-ray fluorescence. The X-ray fluorescence elemental analysis of the CNT assembly detached from the substrate revealed that the carbon weight percent was 99.98% and the iron weight percent was 0.013%. No other element was measured. From these results, the carbon purity was determined as 99.98%.

Orientation Evaluation by θ-2θ Method

The orientation evaluation of the CNT assembly obtained was performed by X-ray diffraction measurement using the θ-2θ method, using an X-ray diffraction apparatus (Rigaku Gorp Diffractometer: RINT-2500/HRPBO) with a Cu-Ka X-ray source at 15 kW power. The X-ray spot size was 0.6 mm. The single-walled CNT assembly used as a specimen was a quadrangular prism measuring 1 m×1 m×10 mm as one of the specifications.

A low-angle (0 to 15 degrees) (CP) diffraction peak was observed, reflecting an interval between the single-walled CNTs. A broad diffraction peak was observed near 25 degrees, reflecting an interval of carbon six-membered ring sheets of different single-walled CNTs. A diffraction peak was observed near 42 degrees, reflecting a (100) plane of a carbon six-membered ring of the single-walled CNT. A diffraction peak was observed near 77 to 78 degrees, reflecting a (110) plane.

A carbon six-membered ring structure of the single-walled CNT does not strictly coincide with the diffraction peak of the graphite, because the carbon six-membered ring structure of the CNT is round and curved. Identification of the diffraction peaks is possible, even though the peak positions slightly vary depending on the size and the degree of alignment of the single-walled CNT.

Herman's orientation factor F was calculated from these results. The value was 0.4 to 0.62 in a (CP) diffraction peak, and 0.75 in a (002) diffraction peak.

Orientation Evaluation by Laue Method

The degree of alignment of the CNT assembly obtained was evaluated by X-ray diffraction measurement using the Laue method. A Bruker SMART APEX CCD area-detector diffractometer (Bruker) was used for the evaluation. Mo-Ka was used as a X-ray source (BRUKERAXS MO CE-SRA) at 4.5-kW power. The distance between a specimen and an X-ray detector was 5.968 cm, the size of a CCD detector was 6.1×6.1 cm, and the X-ray spot size was 0.5 mm.

The aligned single-walled CNT assembly used as the specimen was columnar in shape with 1 mm (diameter)×0.5 mm (height) dimensions as one of the specifications.

The diffraction peaks ((CP), (002), (100), etc.) observed in the single-walled CNT assembly were elliptic, and showed anisotropy. The anisotropy suggests that the single-walled CNTs are aligned.

Herman's orientation factor F was calculated from these results. The value was 0.38 in the (CP) diffraction peak, and 0.61 in the (002) diffraction peak.

Comparative Example 1

A CNT assembly was produced with the same base 1, catalyst, and steps used in Example 1, using the same CNT producing apparatus used in Example 1 with the synthesis furnace 3, the gas flow forming means 21, and the gas blowing means 20, but without the residence time adjusting means 14. Because the residence time adjusting means 14 was lacking, the gas flow forming means 21 and the gas blowing means 20 were separated from the catalyst surface by a distance of 10 mm.

In the configuration of this apparatus, the heat volume 15 is specified as 116 cm$^3$ (28.3 cm$^3$–volume between the gas blowing means 20 and surface of the catalyst layer 2 (cross sectional area 28.3 cm$^2$×distance 1 cm)+gas flow forming means 21 volume 47.3 cm$^3$ (cross sectional area 28.3 cm$^2$×height 1.67 cm)+gas supply pipe 4 volume 40.3 cm$^3$ (cross sectional area 3.1 cm$^2$×13 cm). The evacuation volume 16 is 318 cm$^3$ (feedstock gas channel cross sectional area 28.3 cm$^2$×heating region 7 distance 26.5 cm/2–2 cm=11.3 cm)), smaller than the heat volume 15.

A CNT assembly was produced using the same steps and the same producing method used in Example 1. In this producing method, the yield was 1.5 mg/cm$^2$, and the growth rate was 80 μm/min.

The results are summarized in Table 1.

DESCRIPTION OF REFERENCE NUMERALS AND SIGNS

1 Base
2 Catalyst layer
3 Synthesis furnace
4 Gas supply pipe
5 Gas exhaust pipe
6 Heating means
7 Heating region
8 Base holder
9 Feedstock gas cylinder
10 Catalyst-activating substance cylinder
11 Atmosphere gas cylinder
12 Reducing gas cylinder
13 Carbon weight flux adjusting means
14 Residence time adjusting means
15 Heat volume
16 Evacuation volume
17 Feedstock gas channel
18 Area of the surface where catalyst layer and feedstock gas channel cross
19 Carbon weight flux
20 Gas blowing means
21 Gas flow forming means
22 Turbulence suppressing means

The invention claimed is:

1. A carbon nanotube producing method comprising:
preparing a base having a catalyst layer, and disposing the base in a synthesis furnace;
blowing an oxygen-free, carbon compound-containing feedstock gas from a feedstock gas supply pipe toward the catalyst layer provided on the base over a surface of the base;
forming a heating region in the synthesis furnace by heating the feedstock gas supplied into the synthesis furnace through a blow hole of the feedstock gas supply pipe;
adjusting a residence time of the feedstock gas so as to increase by increasing a heat volume, wherein the heat volume is a volume of a channel for the feedstock gas supplied into the heating region so as to come into contact with the catalyst layer on the base; and
evacuating the feedstock gas out of the synthesis furnace,
wherein said adjusting of the residence time comprises arranging the catalyst layer and the blow hole such that the blow hole is provided opposite a surface of the catalyst layer, and such that the distance between the surface of the catalyst layer and the blow hole is 40 mm or more,

TABLE 1

| | Yield (mg/cm$^2$) | Growth rate (μm/min) | Residence time (sec) | Form of carbon assembly | CNT purity | CNT specific surface area | CNT uniformity |
|---|---|---|---|---|---|---|---|
| Example 1 | 7 | 620 | 7 | Aligned single-walled CNT | 99.98% | 1,149 m$^2$/g | ○ |
| Example 2 | 3 or more | 200 or more | 4-30 | Aligned single-walled CNT | 99.98% | 1,149 m$^2$/g | ○ |
| Com. Ex. 1 (No residence time adjusting means) | 1.5 | 80 | 1.8 | Aligned single-walled CNT | 99.98% | 1,000 m$^2$/g | Δ | and wherein the residence time is adjusted to be in a range of 4 seconds to 30 seconds.

2. The carbon nanotube producing method according to claim 1, wherein the base is disposed at a position where an evacuation volume is smaller than the heat volume, the evacuation volume being specified by a volume of the feedstock gas heated in the heating region through a channel after contacting the base and being evacuated out of the synthesis furnace.

* * * * *